US012810488B2

(12) United States Patent
Evans et al.

(10) Patent No.: US 12,810,488 B2
(45) Date of Patent: Nov. 24, 2026

(54) COMPRESSION OF SIGNED DISTANCE FUNCTION GRIDS VIA A DISTANCE-GUIDED MULTI-RESOLUTION PREDICTOR-CORRECTOR SCHEME

(71) Applicant: NVIDIA Corporation, Santa Clara, CA (US)

(72) Inventors: Alex John Bauld Evans, London (GB); James Lucas, Royston (GB); Bartlomiej Wronski, Brooklyn, NY (US)

(73) Assignee: NVIDIA Corporation, Santa Clara, CA (US)

(*) Notice: Subject to any disclaimer, the term of this patent is extended or adjusted under 35 U.S.C. 154(b) by 96 days.

(21) Appl. No.: 18/978,168

(22) Filed: Dec. 12, 2024

(65) Prior Publication Data

US 2026/0170701 A1 Jun. 18, 2026

(51) Int. Cl.
*G06T 9/20* (2006.01)
*G06T 3/4076* (2024.01)
*G06T 17/20* (2006.01)

(52) U.S. Cl.
CPC .............. *G06T 9/20* (2013.01); *G06T 3/4076* (2013.01); *G06T 17/20* (2013.01); *G06T 2210/36* (2013.01); *G06T 2210/56* (2013.01)

(58) Field of Classification Search
CPC ......... G06T 9/20; G06T 3/4076; G06T 17/20; G06T 2210/36; G06T 2210/56
USPC .......................................................... 345/420
See application file for complete search history.

(56) References Cited

U.S. PATENT DOCUMENTS

| | | | | |
|---|---|---|---|---|
| 11,037,341 B1* | 6/2021 | Gori | ........................ | G06N 20/00 |
| 2016/0364907 A1* | 12/2016 | Schoenberg | ......... | G02B 27/017 |
| 2022/0130127 A1* | 4/2022 | Zhang | ..................... | G06F 30/27 |
| 2022/0172423 A1* | 6/2022 | Takikawa | .............. | G06T 15/005 |
| 2022/0392162 A1* | 12/2022 | Shen | ........................ | G06T 17/20 |
| 2024/0303908 A1* | 9/2024 | Zhang | ........................ | G06T 3/40 |

OTHER PUBLICATIONS

Takikawa, T., et al., "Neural geometric level of detail: Real-time rendering with implicit 3D shapes," CVPR 2021.
Takikawa, T., et al., "Variable bitrate neural fields," arXiv preprint arXiv:2206.07707v1, 2022.
Tsang, F., et al., "Kaolin: A pytorch library for accelerating 3D deep learning research," arXiv preprint arXiv:1911.05063v2, 2019.
Kim, D., et al., "NeuralVDB: High-resolution sparse volume representation using hierarchical neural networks," arXiv preprint arXiv:2208.04448v2, Feb. 11, 2024.

(Continued)

*Primary Examiner* — Jin Ge
(74) *Attorney, Agent, or Firm* — Leydig, Voit & Mayer, Ltd.

(57) ABSTRACT

Systems and methods are provided for compressing signed distance function (SDF) grids, for encoding an SDF grid into a data stream, and for decoding a data stream to generate an SDF grid. The systems and methods provided herein employ a prediction-correction scheme that repeatedly upsamples an SDF grid to generate predicted SDF values for new grid points and determines residuals for the SDF values for new grid points that satisfy a predetermined, distance-based condition.

20 Claims, 23 Drawing Sheets

(56) References Cited

OTHER PUBLICATIONS

Storti, D., et al., "Wavelet SDF-Reps: Solid modeling with volumetric scans," Comput.Inf.Sci.Eng., Sep. 2009, 9(3):031006.

Frisken, S., et al., "Adaptively sampled distance fields: A general representation of shape for computer graphics," Mitsubishi Electric Research Laboratories, Cambridge Research Center, Apr. 25, 2000.

* cited by examiner

COMPRESSION OF SIGNED DISTANCE FUNCTION GRIDS VIA A DISTANCE-GUIDED MULTI-RESOLUTION PREDICTOR-CORRECTOR SCHEME

FIELD

The present disclosure relates to systems and methods for digitally representing two- and three-dimensional objects in applications including, e.g., computer graphics, computer vision, and robotics. In particular, the present disclosure provides systems and methods for compressing signed distance function (SDF) grids.

BACKGROUND

Signed distance functions (SDFs) can be used to represent shapes and objects in a variety of different applications, including in computer graphics, computer vision, robotics (e.g. robot path planning), physics simulation and collision detection, computer-aided design (CAD) modeling, and design. An SDF takes a point in space as input and returns, as output, a value indicating (i) the shortest distance from the input point to the surface of a shape or object, and (ii) whether the input point is inside (negative value) or outside (positive value) the shape or object. The SDF outputs '0' for input points that are directly on the surface of the shape or object.

An SDF can be represented on a regular grid of voxels. However, because the number of voxels grows cubically with resolution, higher-resolution SDF grids can be very bulky. This limits their usefulness for space- or memory-constrained applications, such as online and offline gaming, web streaming, and high-resolution simulations.

BRIEF DESCRIPTION OF THE DRAWINGS

Systems and methods of the present disclosure are described herein below with reference to the attached drawing figures, wherein.

DETAILED DESCRIPTION

Figure 1:
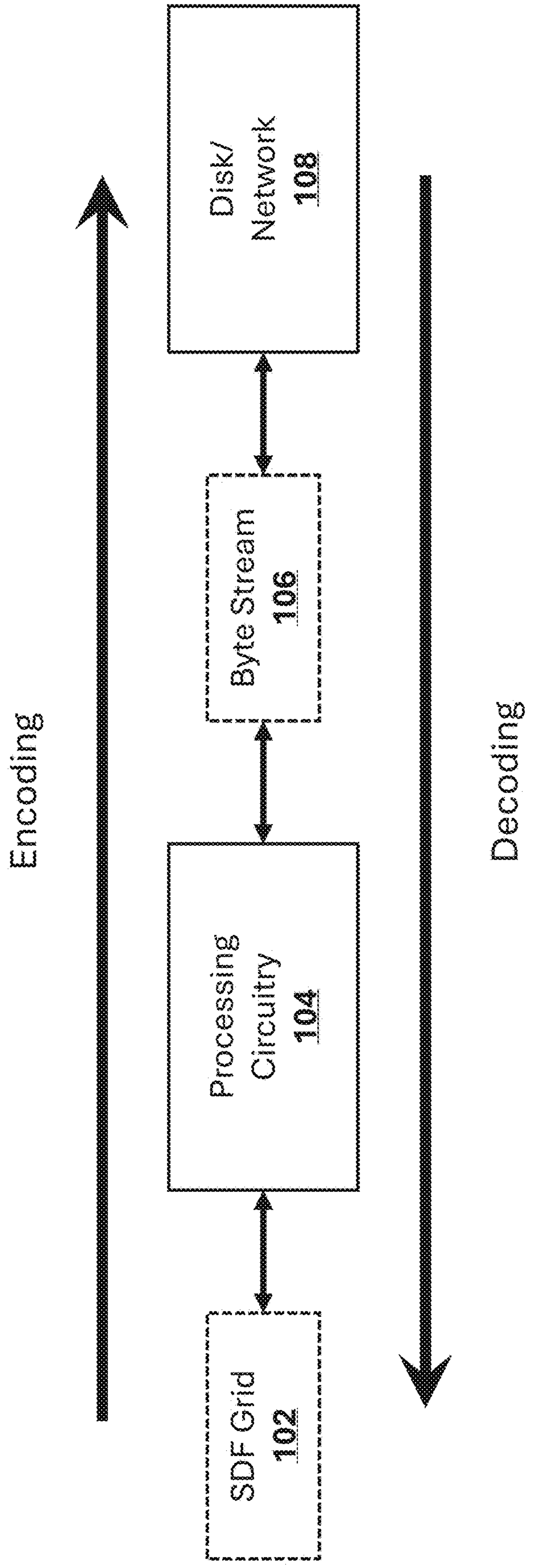
FIG. 1 illustrates a block diagram of an example system suitable for use in implementing embodiments of the present disclosure.

Systems and methods are disclosed herein that relate to techniques for encoding an object representation, i.e. an SDF grid, into a byte stream and for decoding a byte stream to produce an object representation, i.e. an SDF grid.

According to embodiments of the invention, both the encoding process and the decoding process begin by defining a coarse SDF grid of low resolution and then repeatedly implementing a distance-guided, multi-resolution prediction-correction scheme. The prediction-correction scheme involves (i) upsampling the SDF grid to generate an SDF grid of higher resolution with predicted SDF values for new grid points and (ii) correcting the SDF values for new grid points that satisfy a predetermined condition. The predetermined condition is a distance-guided condition that provides for correcting SDF values near the surface of the represented object while not correcting SDF values far from the surface of the object. By using such a distance-guided condition and only correcting SDF values near the surface of the represented object, two objectives can be simultaneously accomplished. First, by correcting SDF values near the surface of the represented object, the accuracy of the resulting SDF grid increases with proximity to the object, perfectly preserving the object's silhouette and ensuring sufficiently high resolution for downstream applications. Second, by reducing the number of predicted values that are corrected, the prediction-correction scheme achieves greater degrees of compression and improves compression speed as compared to alternative compression techniques.

During encoding, residuals for such new grid points are stored for streaming to a disk or network. During decoding, residuals for such new grid points are read from a bytestream. Because the encoding and decoding processes are symmetric (the predetermined condition is identical for both processes), a point in the SDF grid to which a respective residual value corresponds is determined by its position in the byte stream. As a result, there is no need to include residual position information in the byte stream, and the SDF grid requires less memory for storage and/or lower bandwidth for transmission.

In some embodiments, the predetermined condition is selected to provide for lossless compression of regions of the SDF grid near the surface of the represented object, while in other embodiments, the predetermined condition is selected to provide varying degrees of lossy compression of regions of the SDF grid near the surface of the represented object. In some embodiments, the byte stream is further compressed during encoding, e.g. via off-the-shelf entropy coding techniques, and decompressed during decoding. In some embodiments, color and/or other additional attributes for the object/shape represented by the SDF grid can be encoded and decoded via the same prediction-correction scheme.

The techniques disclosed herein for encoding an SDF grid into a byte stream and for decoding a byte stream to produce an SDF grid provide for significant advantages as compared to alternative techniques. By providing an SDF grid with values that increase in accuracy with proximity to the object, the techniques disclosed herein provide SDF grids with sufficiently high resolution for a variety of downstream applications including, e.g., computer graphics, computer vision, robotics (e.g. robot path planning), physics simulation and collision detection, computer-aided design (CAD) modeling, and design. Furthermore, by providing highly efficient encoding of SDF grids, the techniques disclosed herein provide for storing SDF grids in considerably smaller file sizes and achieve significant improvements in compression quality factor. Notably, the techniques disclosed herein provide for considerable reduction in file size without sacrificing accuracy in representing the shape/geometry of a represented object by providing SDF values that are approximate (interpolated from coarse grid levels) in regions of the SDF grid that are far from any object surface.

According to a first aspect, a computer-implemented method for compressing a digital representation of an object is provided. The method according to the first aspect includes defining an initial signed distance function (SDF) grid representing the object. The method further includes performing, for each of a plurality of iterations: (i) upsampling a prior coarse SDF grid to produce an upsampled SDF grid comprising a predicted SDF value for each of a plurality of new corners, (ii) identifying one or more new corners that satisfy a predetermined condition, and (iii) computing, for each respective identified new corner, a residual value that corrects the predicted SDF value for the respective identified new corner to provide a corrected SDF value for the respective identified new corner. The method additionally includes providing a data stream that encodes a final SDF grid representing the object, the data stream comprising the residual values computed during each of the plurality of iterations. The prior coarse SDF grid is, in a first of the plurality of iterations, the initial SDF grid and is, in each subsequent iteration, an SDF grid produced during a prior iteration.

According to at least one embodiment of the method according to the first aspect, a correspondence between each respective residual value in the data stream and a corner in the final SDF grid is provided by a position of the respective residual value in the data stream.

According to at least one embodiment of the method according to the first aspect, the data stream encodes the final SDF grid without including separate bits or bytes that provide residual position information.

According to at least one embodiment, the method according to the first aspect further includes compressing the data stream and transmitting the compressed data stream via a network and/or storing the compressed data stream to a disk. In at least one embodiment, compressing the data stream is performed via an entropy coding technique.

According to at least one embodiment of the method according to the first aspect, the identifying the one or more new corners that satisfy the predetermined condition comprises identifying one or more new corners that lie within or adjacent to a crust that surrounds a surface of the object. In at least one embodiment, a thickness of the crust is defined based on a resolution of the upsampled SDF grid or based on a resolution of the prior coarse SDF grid. In at least one embodiment, the thickness of the crust is defined to provide lossless compression of the SDF gid within the crust.

According to at least one embodiment of the method according to the first aspect, an attribute value is provided for each corner in the initial SDF grid and for each corner in the final SDF grid, and the method further includes performing, for each iteration of the plurality of iterations, (iv) predicting, for each of plurality of new corners produced by upsampling the prior coarse SDF grid, an attribute value, and (v) computing, for each respective identified new corner, an attribute residual value that corrects the predicted attribute value for the respective identified new corner to provide a corrected attribute value for the respective identified new corner. The data stream that encodes the final SDF grid representing the object additionally comprises the attribute residual values computed during each of the plurality of iterations. In at least one embodiment, the attribute value is a color value and/or a texture value.

According to a second aspect, a computer-implemented method for generating an SDF grid representing an object is provided. The method according to the second aspect includes decoding the data stream, provided by the method according to the first aspect—including any embodiment thereof, to generate the SDF grid representing the object.

According to a third aspect, a system for generating an SDF grid representing an object is provided. The system includes processing circuitry configured to decode the data stream, provided by the method according to the first aspect—including any embodiment thereof, to generate the SDF grid representing the object. The system according to the third aspect further includes memory configured to store the SDF grid representing the object.

According to a fourth aspect, a system for compressing a digital representation of an object is provided. The system according to the fourth aspect includes processing circuitry configured to define an initial signed distance function (SDF) grid representing the object. The processing circuitry is further configured to perform, for each of a plurality of iterations: (i) upsampling a prior coarse SDF grid to produce an upsampled SDF grid comprising a predicted SDF value for each of a plurality of new corners, (ii) identifying one or more new corners that satisfy a predetermined condition, and (iii) computing, for each respective identified new corner, a residual value that corrects the predicted SDF value for the respective identified new corner to provide a corrected SDF value for the respective identified new corner. The processing circuitry is further configured to provide a data stream that encodes a final SDF grid representing the object, the data stream comprising the residual values computed during each of the plurality of iterations. The system according to the fourth aspect further includes memory configured to store the data stream. The prior coarse SDF grid is, in a first of the plurality of iterations, the initial SDF grid and is, in each subsequent iteration, an SDF grid produced during a prior iteration.

According to at least one embodiment of the system according to the fourth aspect, a correspondence between each respective residual value in the data stream and a corner in the final SDF grid is provided by a position of the respective residual value in the data stream.

According to at least one embodiment of the system according to the fourth aspect, the data stream encodes the final SDF grid without including separate bits or bytes that provide residual position information.

According to at least one embodiment of the system according to the fourth aspect, the processing circuitry is further configured to compress the data stream and transmit the compressed data stream via a network and/or storing the compressed data stream to a disk.

According to at least one embodiment of the system according to the fourth aspect, the identifying the one or more new corners that satisfy the predetermined condition comprises identifying one or more new corners that lie within or adjacent to a crust that surrounds a surface of the object. In at least one embodiment, a thickness of the crust is defined based on a resolution of the upsampled SDF grid or based on a resolution of the prior coarse SDF grid.

According to a fifth aspect, a non-transitory computer readable medium is provided having stored thereon executable instructions that, when executed by processing circuitry, cause the processing circuitry to perform the method according to the first aspect—including any embodiment thereof. According to a sixth aspect, a non-transitory computer readable medium is provided having stored thereon executable instructions that, when executed by processing circuitry, cause the processing circuitry to perform the method according to the second aspect.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIG. 1 illustrates a block diagram of an example system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the system 100 is within the scope and spirit of embodiments of the present disclosure.

System 100 includes processing circuitry 104 configured to (i) execute an algorithm for encoding an SDF grid 102 into a byte stream 106, which is provided as output by the processing circuitry and stored/transmitted on/via disk/network 108 and (ii) execute an algorithm for decoding a byte stream 106, which is received as input, to generate an SDF grid 102, which is provided as output by the processing circuitry. The system 100 is configured to execute (i) an algorithm that carries out an encoding process (e.g. the encoding process illustrated in FIG. 2A) and (ii) an algorithm that carries out a decoding process (e.g. the decoding process illustrated in FIG. 2B). The encoding process and the decoding process are symmetrical; both processes are able to determine a point in the SDF grid to which a residual value (as indicated by a respective byte) corresponds based on the position of that respective byte in the byte stream. As a result, the requirement of including residual position information in the byte stream is eliminated. In at least one embodiment, the residual values are written/transmitted in Morton order to ensure positional agreement between the encoding and decoding processes. In at least one embodiment, the byte stream 106 is compressed, e.g. via off-the-shelf entropy coding techniques, prior to being stored/transmitted on/via disk/network 108.

Figure 2A:
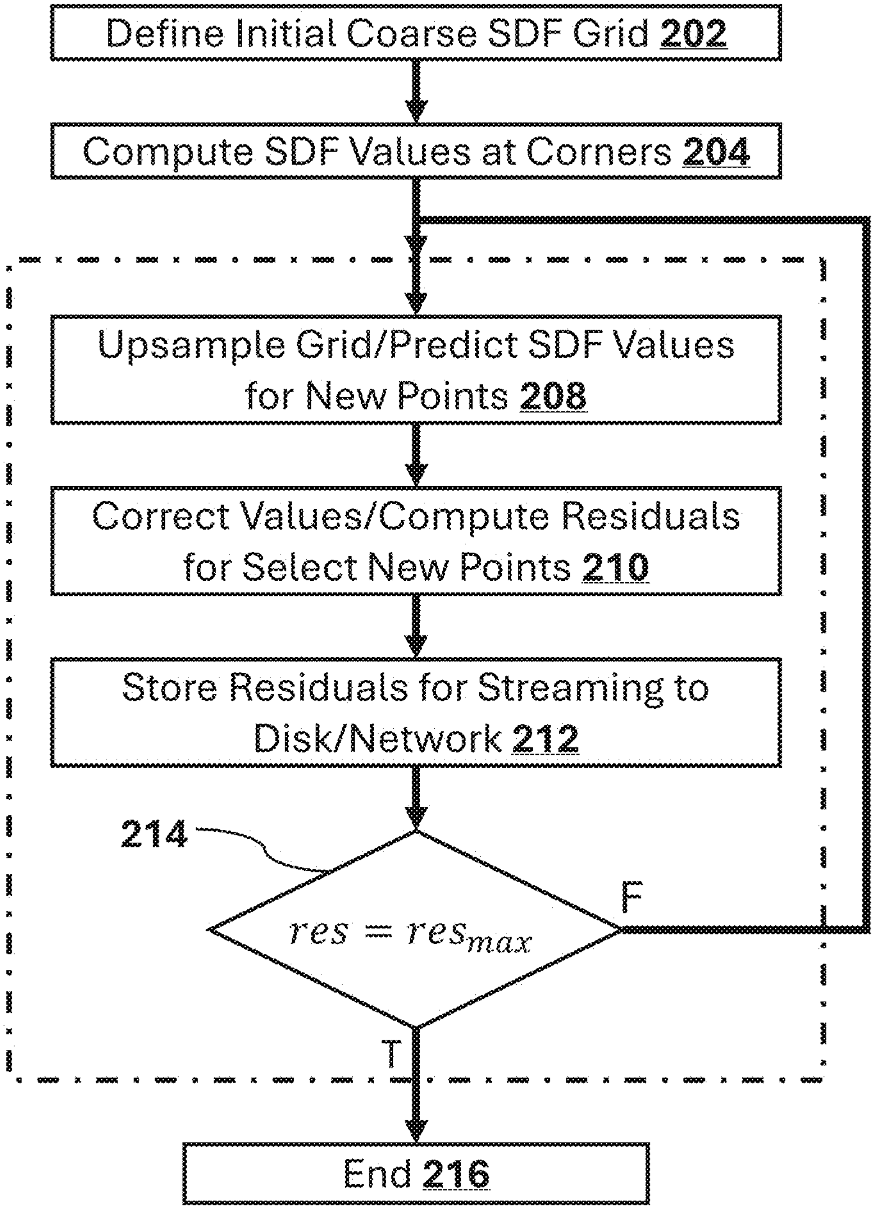
FIG. 2A is a flow diagram illustrating a method, according to at least one embodiment, for generating a byte stream that encodes an SDF grid.
Figure 2B:
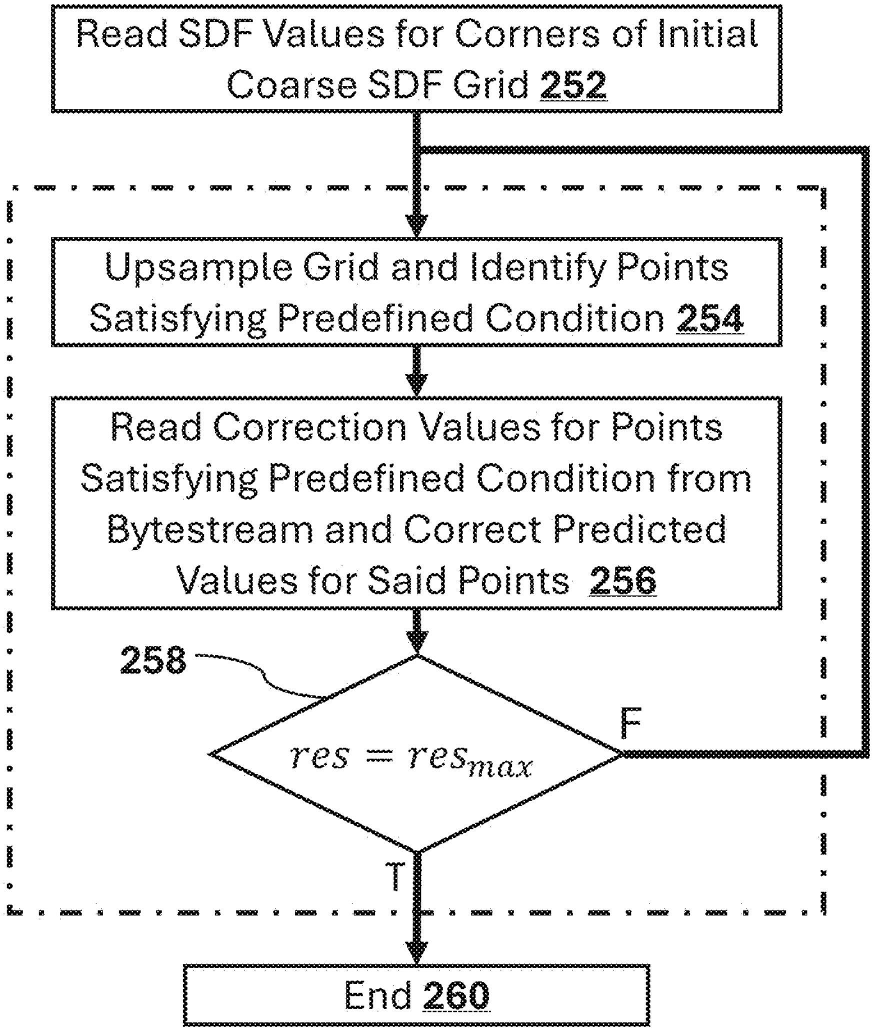
FIG. 2B is a flow diagram illustrating a method, according to at least one embodiment, for decoding a byte stream to generate an SDF grid.

In various embodiments, the processing circuitry 104 is a Central Processing Unit (CPU) configured to execute program instructions and performing basic arithmetic, logic, control, and I/O operations, e.g. as necessary to carry out the encoding process illustrated in FIG. 2A and the decoding process illustrated in FIG. 2B. In various embodiments, the processing circuitry 104 can include one or more Digital Signal Processors (DSPs) and/or Field-Programmable Gate Arrays (FPGAs). Processing circuitry 104 can, in various embodiments, be implemented as one or more standalone chips or integrated within system-on-chip (SoC) designs.

FIG. 2A is a flow diagram illustrating a method 200, according to at least one embodiment, for generating a byte stream that encodes a compressed high-resolution SDF grid. FIG. 2B is a flow diagram illustrating a method 250, according to at least one embodiment, for decoding a byte stream to generate a high-resolution SDF grid. Each block of method 200 and of method 250, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 and method 250 are described, by way of example, with respect to the system of FIG. 1. However, these methods may additionally or alternatively be executed by any one system, or any combination of systems, including, but not limited to, those described herein. Furthermore, persons of ordinary skill in the art will understand that any system that performs method 200 or method 250 is within the scope and spirit of embodiments of the present disclosure.

FIG. 2A is a flow diagram illustrating a method 200, according to at least one embodiment, for generating a byte stream that encodes a compressed high-resolution SDF grid. Method 200 begins by defining, at 202, a coarse SDF grid and computing, at 204, SDF values at corners of the coarse SDF grid defined at 202. An SDF grid is a regular grid of voxels that provides, for each corner point thereof, a value indicating (i) the shortest distance from said corner point to the surface of a shape or object and (ii) whether said corner point is inside (negative value) or outside (positive value) the shape or object. In at least one embodiment, method 200 computes the SDF values at 204 by reading out values from an uncompressed, high-resolution SDF grid at points corresponding to the corners of the coarse SDF grid defined at 202. Alternatively, in at least one embodiment, the process computes SDF values for points that correspond to the corners of the coarse SDF grid from a 2D or 3D representation of a shape or object, for example a point cloud, a polygon mesh, or a voxel grid.

At 208, method 200 upsamples a coarse SDF grid (i.e. the coarse SDF grid defined at 202 or an SDF grid resulting from upsampling during a prior iteration), thereby creating new corners of an upsampled SDF grid at points on gridlines halfway between corners of the coarse SDF grid. In at least one embodiment, method 200 upsamples the coarse SDF grid one dimension at a time. Alternatively, in at least one embodiment, method 200 upsamples the coarse SDF grid in two or three dimensions at the same time. During upsampling of the coarse SDF grid at 208, method 200 predicts SDF values for each new corner according to an upsampling/prediction technique. In at least one embodiment, the SDF values for each new corner are predicted at 208 via linear interpolation, using the values of neighboring corners of the coarse SDF grid. In at least one embodiment, the SDF values are predicted at 208 via cubic interpolation.

At 210, the values predicted at 208 for new points within or adjacent to a crust are corrected, and residuals equal to the difference between the corrected values determined at 210 and the values predicted at 208 are computed. In at least one embodiment, the crust is defined to include all new corners that neighbor one or more corners of the coarse SDF grid (the coarse SDF grid defined at 202 or an SDF grid resulting from upsampling during a prior iteration, i.e. prior to upsampling at 208 during a current iteration) having a value that is less than or equal to a threshold value. In at least one embodiment, the crust is defined to include all points of the coarse SDF grid having a value that is less than or equal to a threshold value, and values predicted at 208 for all new points with at least one neighboring point in the crust are corrected and residuals are computed therefor. While the upsampling at 208 is performed for every point on the grid, the crust includes only the points for which a residual is computed during encoding/compression and for which a value is read from a disk/stream during decoding/decompression. In at least one embodiment, method 200 determines the correct values at 210 by reading out values from an uncompressed, high-resolution SDF grid at points corresponding to the new corners. Alternatively, in at least one embodiment, method 200 computes SDF values for points that correspond to the new corners from a 2D or 3D representation of a shape or object. At 212, the residuals are stored (e.g. in a buffer or cache) for streaming to a disk/network.

In various embodiments, the threshold value can be selected to provide lossless compression or lossy compression. Specifically, when the threshold value is chosen to be large enough to define a sufficiently thick crust, the resulting compression of the SDF grid will be lossless near the surface of the represented object/geometry. For example, in at least one embodiment the threshold value is chosen to be equal to a length of a diagonal of the coarse SDF grid, thereby providing lossless compression. Alternatively, in at least one embodiment, the threshold value is chosen to be less than a length of a side of the upsampled SDF grid, thereby providing lossy compression of the SDF grid near the surface of the represented object/geometry. In various embodiments, the threshold value can be determined based on a resolution of the coarse SDF grid (i.e. from the resolution prior to upsampling at 208) and/or based on a resolution of the upsampled SDF grid (i.e. from the resolution occurring as a result of the upsampling at 208). While selecting a smaller threshold value enables higher compression rates and faster compression speeds, it also results in a higher degree of data loss during compression.

At 214, method 200 evaluates whether the resolution resulting from the upsampling at 208 is equal to a maximum resolution for the process. If the maximum resolution has not been realized, method 200 returns to 208, where the SDF grid is again upsampled (the "upsampled" SDF grid of the current iteration becomes the "coarse" SDF grid of a subsequent iteration). If the maximum resolution has been realized, method 200 ends at 216, where the stored residual values are provided as a data stream for storing to a disk/transmitting via a network. In at least one embodiment, the stored residual values are compressed, e.g. using an off-the-shelf entropy coding technique, prior to being stored to a disk/transmitted via a network.

FIG. 2B is a flow diagram illustrating a method 250, according to at least one embodiment, for decoding a byte stream to construct a high-resolution SDF grid. Method 250 begins at 252 by reading values for corners of an initial coarse SDF grid. At 254, method 250 upsamples the coarse SDF grid (i.e. the initial coarse SDF grid for which corner values were read at 252 or an SDF grid resulting from upsampling in a prior iteration), thereby creating new corners of an upsampled SDF grid at points on gridlines halfway between corners of the coarse SDF grid. The upsampling performed at 254 in a respective iteration of the decoding process corresponds to the upsampling performed at 208 in an iteration of the encoding process. At 254, the process also determines, based on the upsampled values, the points within a crust. The crust is defined at 254 in the decoding process in the same manner that the crust defined at 210 in the encoding process. Therefore, the encoding and decoding process remain symmetrical, and the correspondence between residual values in the byte stream (i.e. the byte stream generated by method 200 and the byte stream read by method 250) and points in the high-resolution SDF grid can be determined without including separate bits or bytes that provide residual position information.

At 256, method 250 reads correction values for points within the crust from the bytestream and corrects the upsampled values for the points within the crust. Because of the symmetry between the encoding and decoding processes, in both the upsampling and in the definition of the crust, storing/reading the residuals/correction values in the same order (e.g. the Morton order) during both the encoding and decoding processes obviates the inclusion of residual position information in the byte stream.

At 258, method 250 evaluates whether the resolution resulting from the upsampling at 254 is equal to a maximum resolution. If the maximum resolution has not been realized, method 250 returns to 254, where the SDF grid is again upsampled (the "upsampled" SDF grid of the prior iteration becomes the "coarse" SDF grid of the current iteration). Alternatively, if the maximum resolution has been realized, method 250 ends at 260, where a final, high-resolution SDF grid (generated by the repeated upsampling at 254 and correcting at 256) is provided, e.g. as output.

In some embodiments of the method 200 and the method 250, the SDF grids (i.e. the initial coarse SDF grid, each upsampled SDF grid, and the final, high-resolution SDF grid) provide, for each corner thereof, one or more attribute values in addition to the SDF value. The one or more attribute values can include one or more texture (e.g. color) values. In such embodiments, the SDF values (i.e. the distance values) can be stored in a primary channel and the one or more attribute values can be stored in one or more additional channels. In at least one such embodiment, the distance values are stored in a primary channel and color values are stored in additional channels (e.g. a red channel, a green channel, and a blue channel for RGB color information). In such embodiments, each upsampling iteration provides a predicted value for each of the one or more attributes and the predicted values for new points within the crust are corrected (to generate residuals during encoding or based on residual values read from a byte stream during decoding).

Figure 2C:
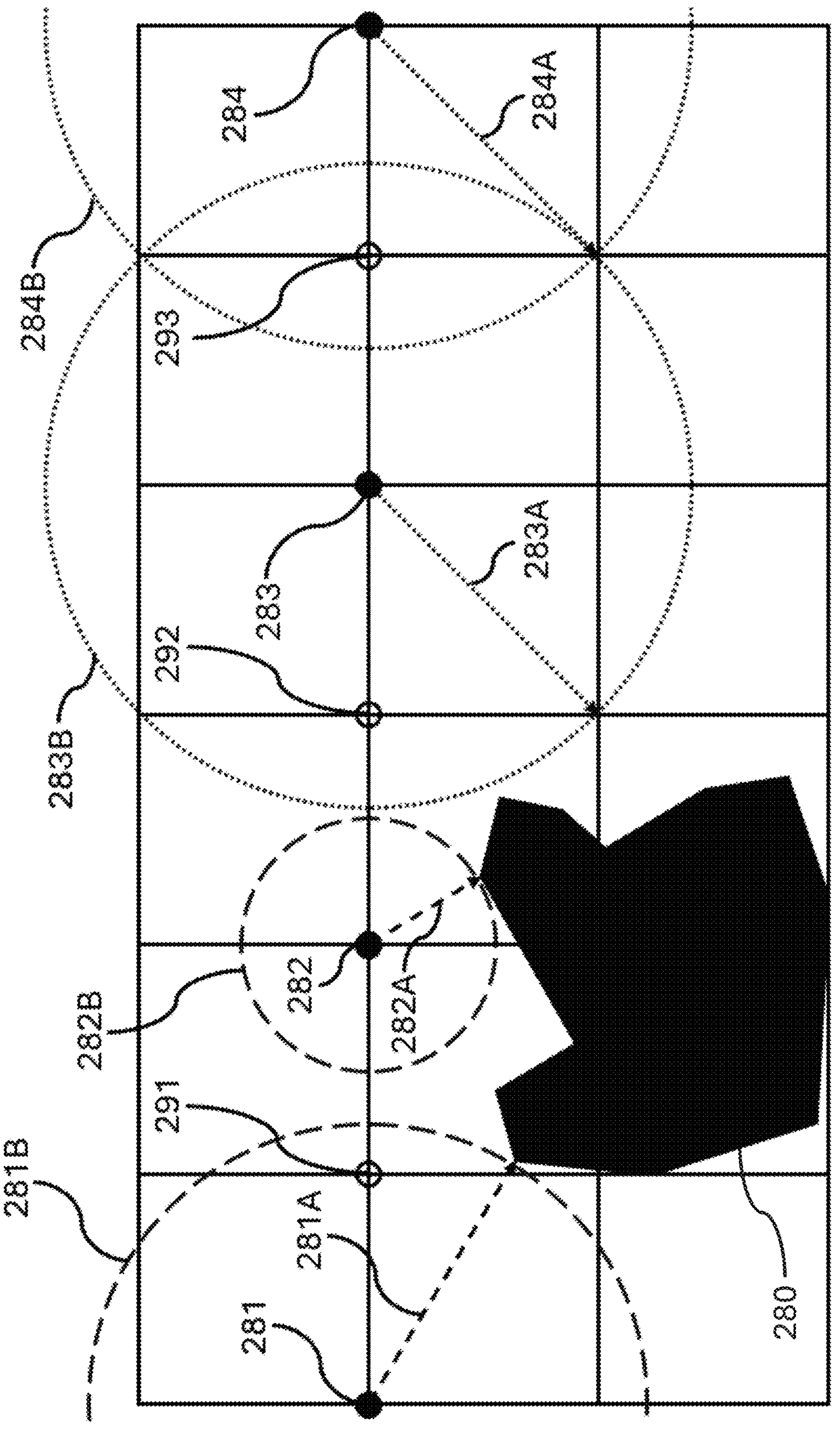
FIG. 2C illustrates a technique, according to at least one embodiment, for determining whether upsampled SDF values are to be corrected during a method for encoding an SDF grid or during a method for decoding a byte stream to provide an SDF grid.

FIG. 2C illustrates a technique, according to at least one embodiment, for defining the crust within which new values are interpolated and corrected following upsampling, e.g. the upsampling performed at 208 of the method 200 or the upsampling performed at 254 of the method 250. FIG. 2C illustrates an SDF grid that includes four points, i.e. 281, 282, 283, and 284, for which an SDF value has previously been computed (i.e. for which an SDF ground truth value is known). During encoding, SDF values for points 281, 282, 283, and 284 can be, e.g, read out from an uncompressed, high-resolution SDF grid for shape/object 280 or computed from an alternative 2D or 3D representation of shape/object 280 (e.g. at 204 or 210 of method 200). During decoding, SDF values for points 281, 282, 283, and 284 can be, e.g, determined by correcting upsampled points using residuals read from a byte stream (e.g. at 256 of method 250). The SDF values for each of points 281, 282, 283, and 284 indicating (i) the shortest distance to the surface of shape/object 280. The points 281, 282, 283, and 284 are corners in a coarse SDF grid.

FIG. 2C additionally illustrates three new points, i.e. 291, 292, and 293, that result from upsampling the coarse SDF grid that includes points 281, 282, 283, and 284. To determine whether new points 291, 292, and 293 are in the crust (which consists of all new points in the upsampled SDF grid that neighbor one or more points of the coarse SDF grid having a value that is less than or equal to a threshold value), the SDF values for each of points 281, 282, 283, and 284 are compared to a threshold value. In FIG. 2C, the threshold value is equal to the length of a diagonal resulting from upsampling the coarse SDF grid in two dimensions, i.e. is equal to the length of arrows 283A and 284A/the radius of circles 283B and 284B. However, in alternative embodiments, the threshold value can be defined differently. For example, in at least one alternative embodiment, the threshold value is equal to the length of a diagonal of the coarse SDF grid in 2D, and, in at least one additional alternative embodiment, the threshold value is equal to the length of a diagonal of the coarse SDF grid in 3D.

In FIG. 2C: (i) the SDF value for point 281, represented by arrow 281A, is less than the threshold value; (ii) the SDF value for point 282, represented by arrow 282A, is less than the threshold value; (iii) the SDF value for point 283 is greater than the threshold value (as shape/object 280 lies beyond circle 283B, which designates the threshold distance from point 283); and (iv) the SDF value for point 284 is greater than the threshold value (as shape/object 280 lies beyond circle 284B, which designates the threshold distance from point 284). Therefore, new point 291 neighbors two points (i.e. 281 and 282) with a value less than or equal to the threshold value, new point 292 neighbors one point (i.e. 282) with a value less than or equal to the threshold value, and new point 293 neighbors no points with a value less than or equal to the threshold value. Accordingly, after the upsampling from which new points 291, 292, and 293 result, new points 291 and 292 are included in the crust and new point 293 is not included in the crust.

Figure 3A:
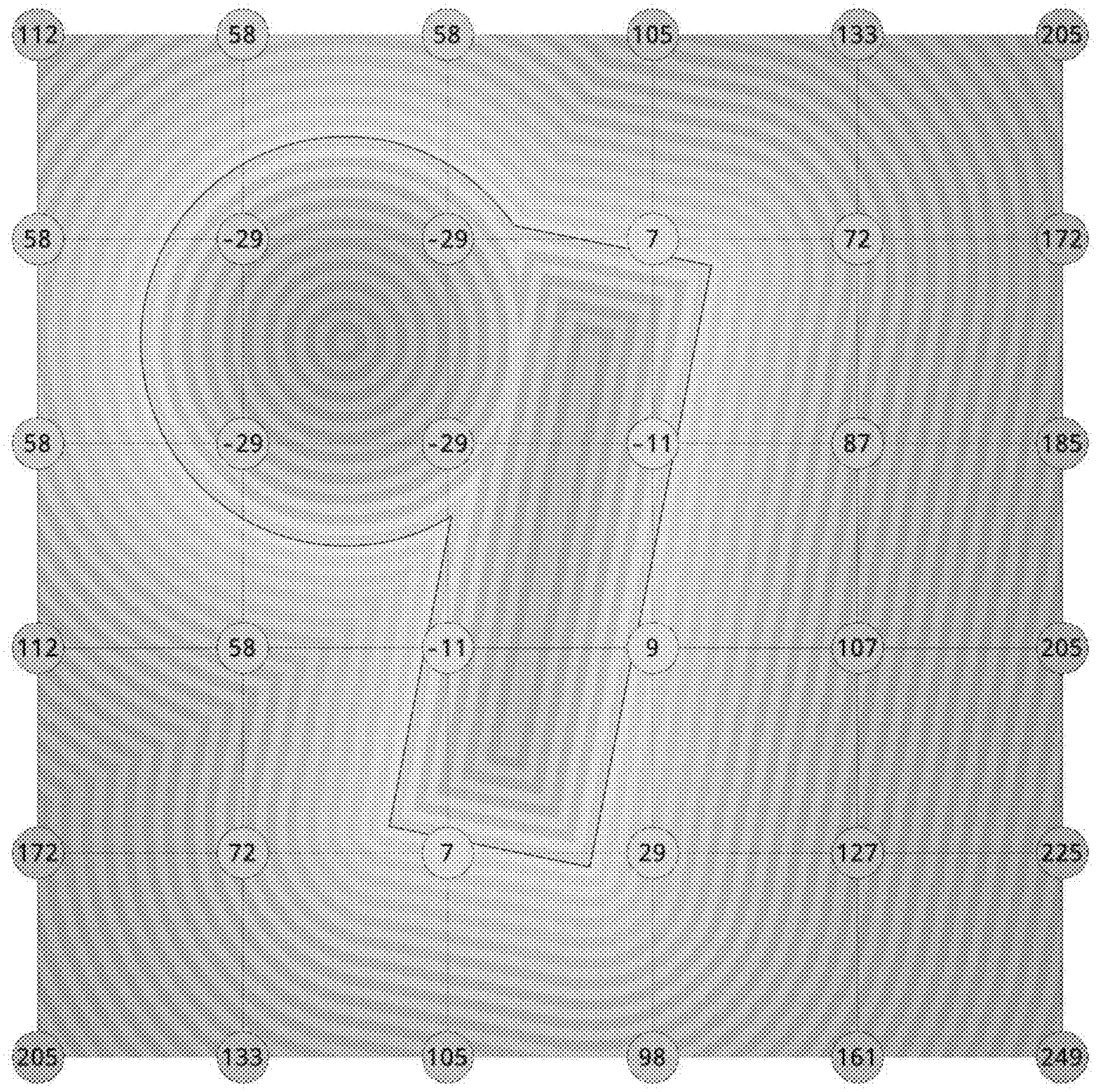
FIGS. 3A through 3N illustrate a series of SDF grids provided during a process, according to at least one embodiment, for generating a byte stream that encodes an SDF grid or a process, according to at least one embodiment, for decoding a byte stream to generate an SDF grid.

FIGS. 3A through 3O illustrate a series of SDF grids provided during either (i) a process, according to at least one embodiment, for encoding an SDF grid into a byte stream (e.g. the method 200) or (ii) a process, according to at least one embodiment, for decoding a byte stream to construct a high-resolution SDF grid (e.g. the method 250). FIG. 3A illustrates a coarse, 5×5 SDF grid having 6×6 corner values. The coarse SDF grid of FIG. 3A can be, e.g., the coarse SDF grid defined at 202 with the SDF corner values computed at 204 of method 200 or the initial coarse SDF grid for which corner values are read at 252 of method 250. Each corner in the coarse SDF grid of FIG. 3A has a value indicating (i) the shortest distance from the corner to the surface of the keyhole shape illustrated therein, and (ii) whether the corner is inside (negative value) or outside (positive value) the keyhole shape.

Figure 3B:
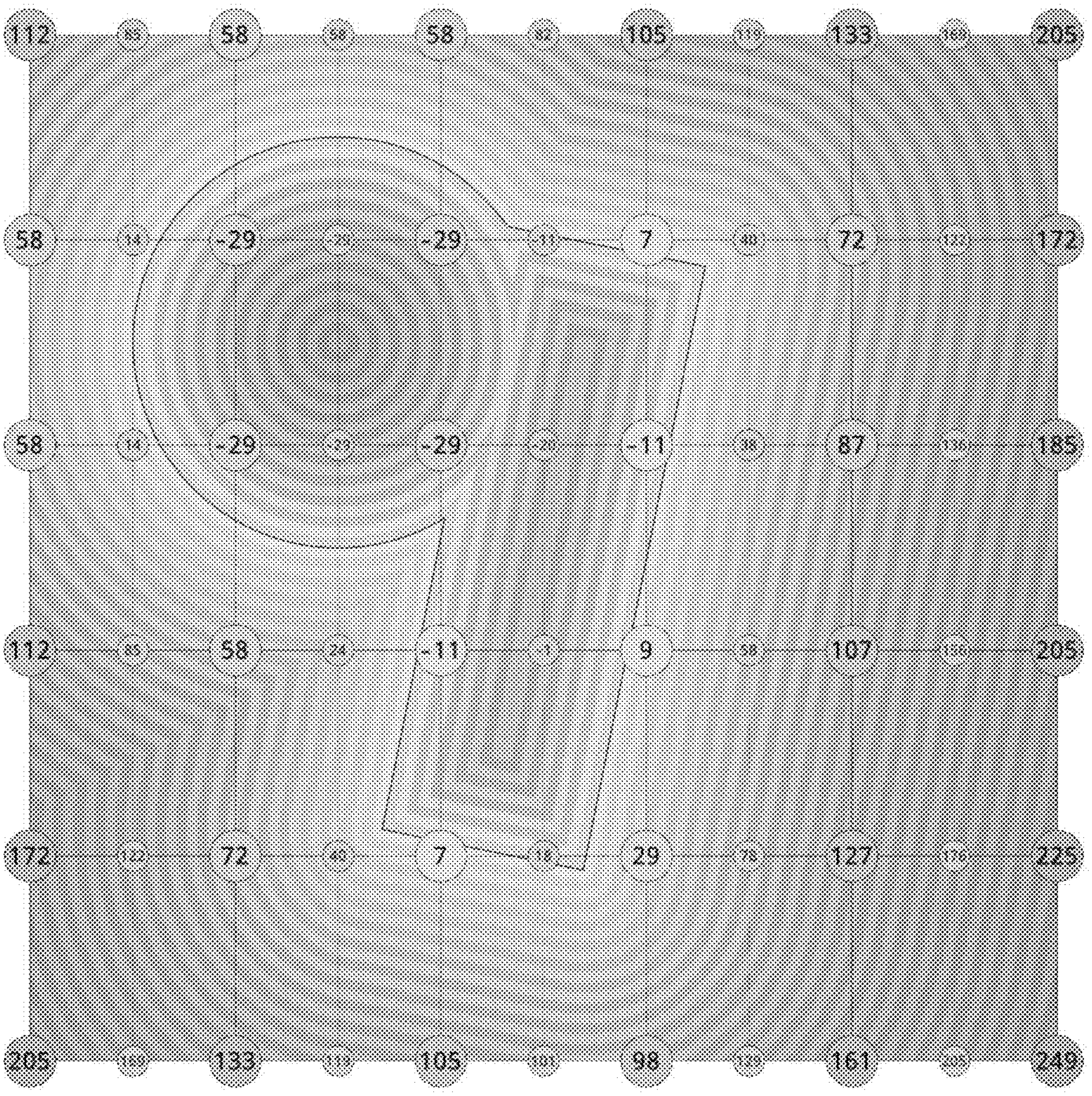

FIG. 3B illustrates an upsampled SDF grid produced by upsampling the coarse SDF grid of FIG. 3A in the horizontal direction. As a result of the upsampling, new corner points are located between corner points of the coarse SDF grid of FIG. 3A in the horizontal direction. The values of the new corner points are determined by linear interpolation using the values of neighboring corner points of the coarse SDF grid of FIG. 3A. The upsampled SDF grid illustrated in FIG. 3B can result, e.g., from the upsampling at 208 of method 200 or from the upsampling at 254 of method 250. Many of the values of the new corner points are inaccurate. However, for values far from the surface of the keyhole shape, the inaccuracies are inconsequential. On the other hand, for values near the surface of the keyhole shape, inaccuracies can be problematic for downstream applications that use the SDF grid.

Figure 3C:
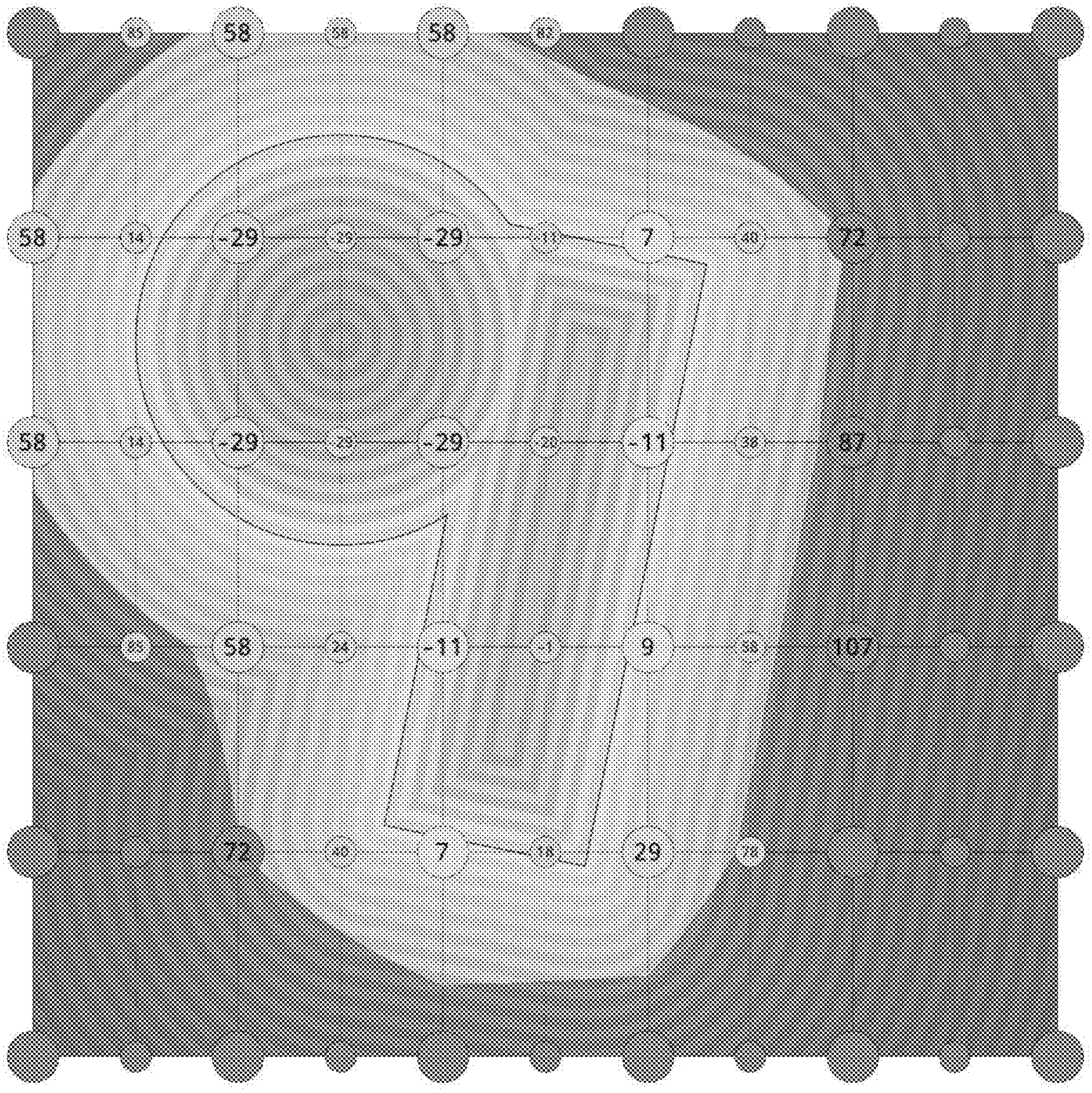

FIG. 3C highlights interpolated values of the new corner points lying within a crust of the upsampled SDF grid of FIG. 3B. The crust is defined to include all new corners that neighbor one or more corners, of the coarse SDF grid of FIG. 3A, that have a value that is less than or equal to a threshold value. In this manner, SDF values for new points that may be near the surface of the keyhole shape are corrected, thereby providing sufficiently high resolution for downstream applications. At the same time, SDF values for new points that are far from the surface of the keyhole shape are not corrected, thereby providing compression of a high-resolution SDF grid (as points on the high-resolution SDF grid can be, when used in downstream applications, interpolated from sparse, ground-truth values). The crust is defined in the same manner for both encoding a high-resolution SDF grid into a byte stream (e.g. at 210 of method 200) or decoding a byte stream to construct a high-resolution SDF grid (e.g. at 254 of method 250).

Figure 3D:
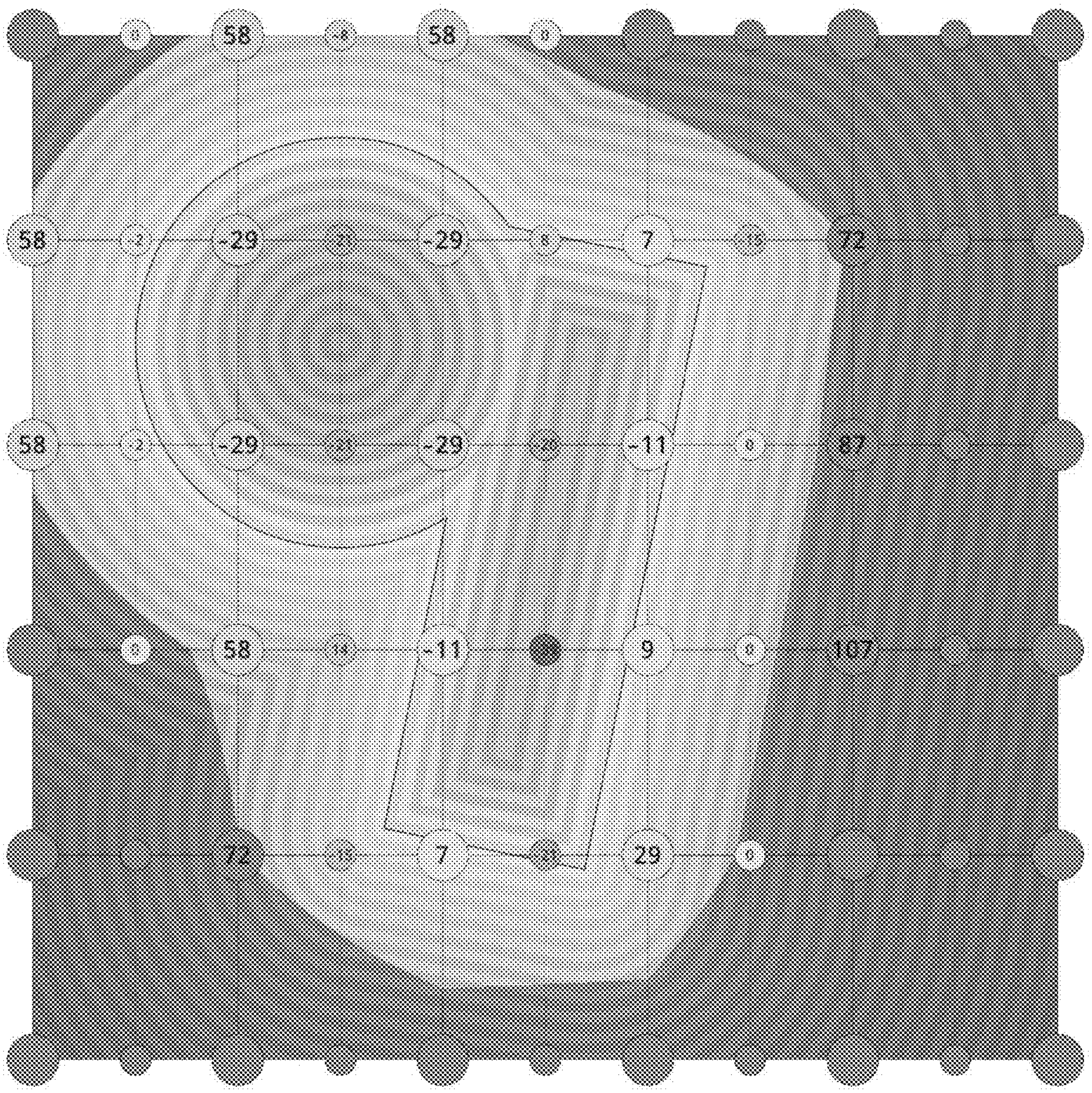

FIG. 3D provides residual/correction values for the new corner points lying within the crust of the upsampled SDF grid of FIG. 3B. In order to determine the residual/correction values during encoding (e.g. at 210 of the method 200), a ground-truth value for each new corner point lying within the crust is determined, e.g. by being read out from an uncompressed, high-resolution SDF grid at points corresponding to the new corner points lying within the crust or computed from an alternative 2D or 3D representation of the keyhole shape. In order to determine the residual/correction values during decoding (e.g. at 256 of the method 250), residuals/correction values are simply obtained from a bytestream that encodes the high-resolution SDF grid. Notably, many of the residual/correction values provided in FIG. 3D—particularly near smooth/flat regions of the surface of the keyhole shape—are equal to zero. As a result, off-the-shelf entropy coding techniques can achieve significant lossless compression when encoding a stream of the residuals.

Figure 3E:
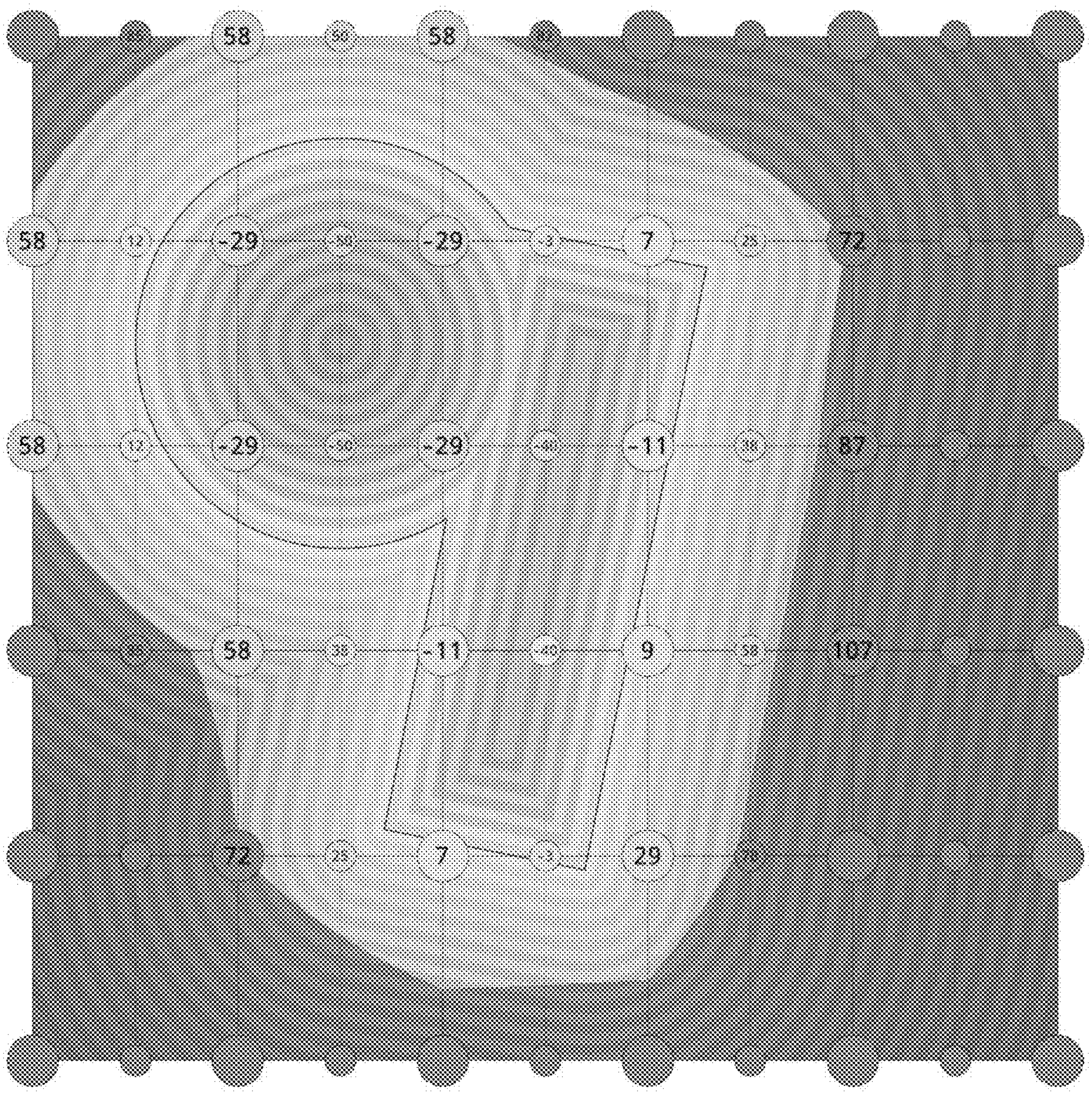

FIG. 3E highlights corrected values of the new corner points lying within the crust of the upsampled SDF grid of FIG. 3B. During encoding (e.g. at 210 of the method 200), the corrected value (i.e. ground-truth value) for each new corner point lying within the crust is determined, e.g. by being read out from an uncompressed, high-resolution SDF grid at points corresponding to the new corner points lying within the crust or computed from an alternative 2D or 3D representation of the keyhole shape. During decoding (e.g. at 256 of method 250), the corrected value for each new corner point lying within the crust is determined by adding a residuals/correction value obtained from a bytestream to a value (highlighted in FIG. 3C) obtained by upsampling (e.g. at 254 of method 250).

Figure 3F:
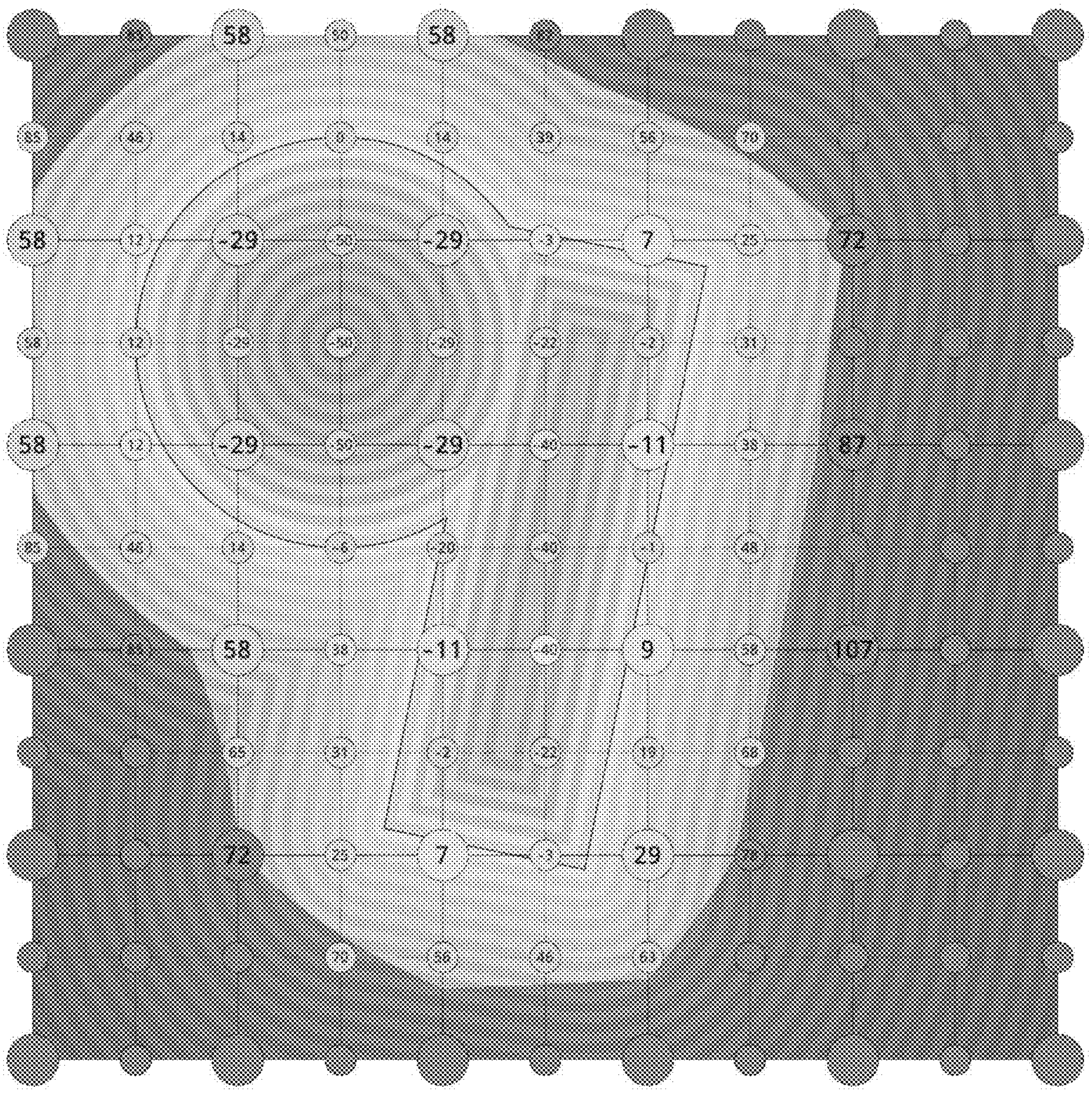

FIG. 3F illustrates an upsampled SDF grid produced by upsampling the SDF grid of FIG. 3B in the vertical direction. As a result of the upsampling, new corner points are located between corner points of the coarse SDF grid of FIG. 3B in the vertical direction. The values of the new corner points are determined by linear interpolation using the values of neighboring corner points of the SDF grid of FIG. 3B. The upsampled SDF grid illustrated in FIG. 3F can result, e.g., from the upsampling at 208 of method 200 (in an iteration where the upsampled SDF grid of FIG. 3B serves as the coarse SDF grid) or from the upsampling at 254 of method 250 (in an iteration where the upsampled SDF grid of FIG. 3B serves as the coarse SDF grid). FIG. 3F only provides values for new corner points that lie within a crust of FIG. 3F. As was the case for the upsampled SDF grid of FIG. 3B, many of the values of the new corner points in FIG. 3F are inaccurate (which, again, is inconsequential for values far from the surface of the keyhole shape but not for values near the surface).

Figure 3G:
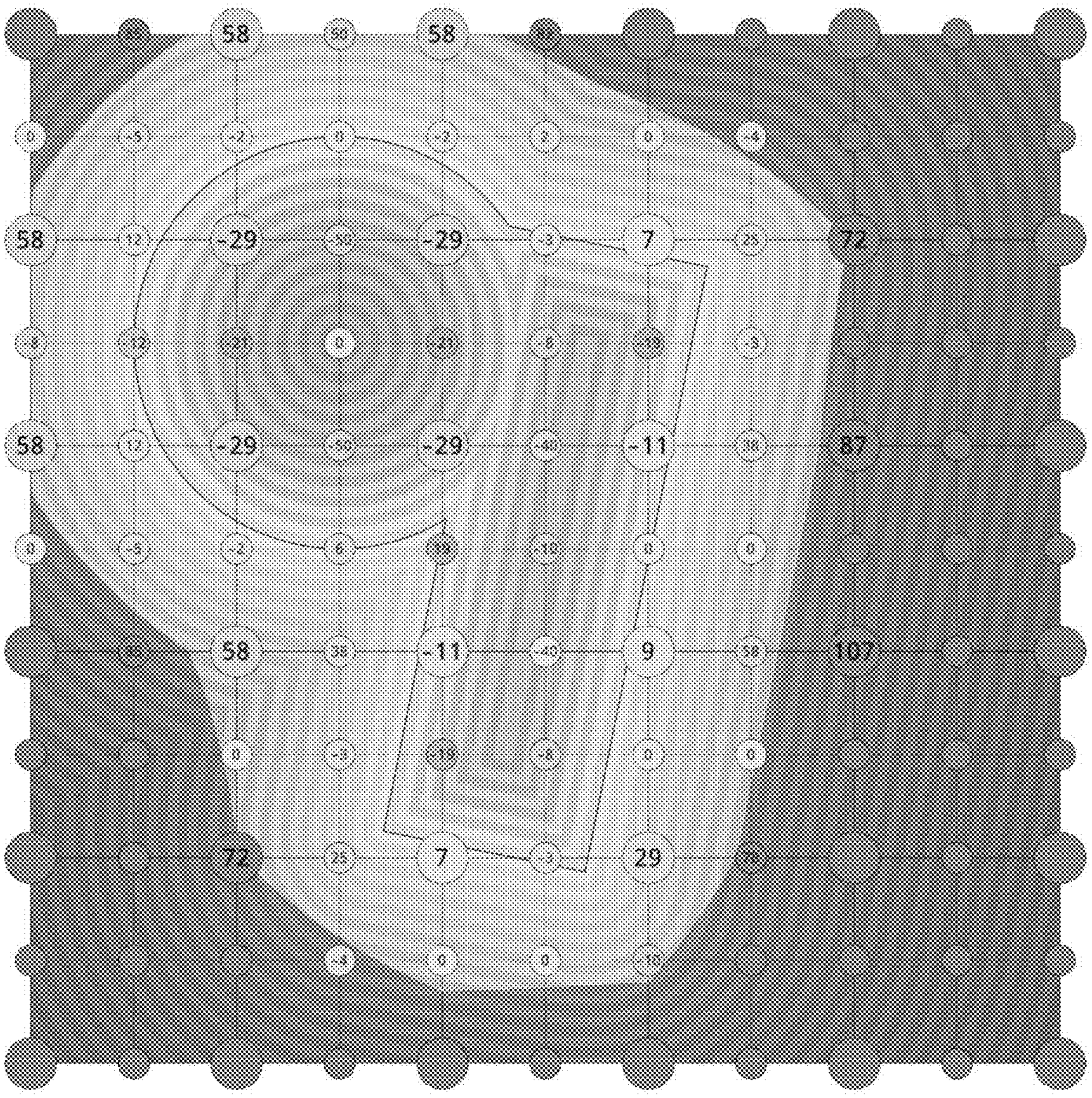

FIG. 3G provides residual/correction values for the new corner points lying within the crust of the upsampled SDF grid of FIG. 3F. In order to determine the residual/correction values during encoding (e.g. at 210 of the method 200), a ground-truth value for each new corner point lying within the crust is determined, e.g. by being read out from an uncompressed, high-resolution SDF grid at points corresponding to the new corner points lying within the crust or computed from an alternative 2D or 3D representation of the keyhole shape. In order to determine the residual/correction values during decoding (e.g. at 256 of the method 250), residuals/correction values are simply obtained from a bytestream that encodes the high-resolution SDF grid. As was the case with the residual/correction values provided in FIG. 3D, many of the residual/correction values provided in FIG. 3G are equal to zero such that off-the-shelf entropy coding techniques can achieve significant lossless compression when encoding a stream of the residuals.

Figure 3H:
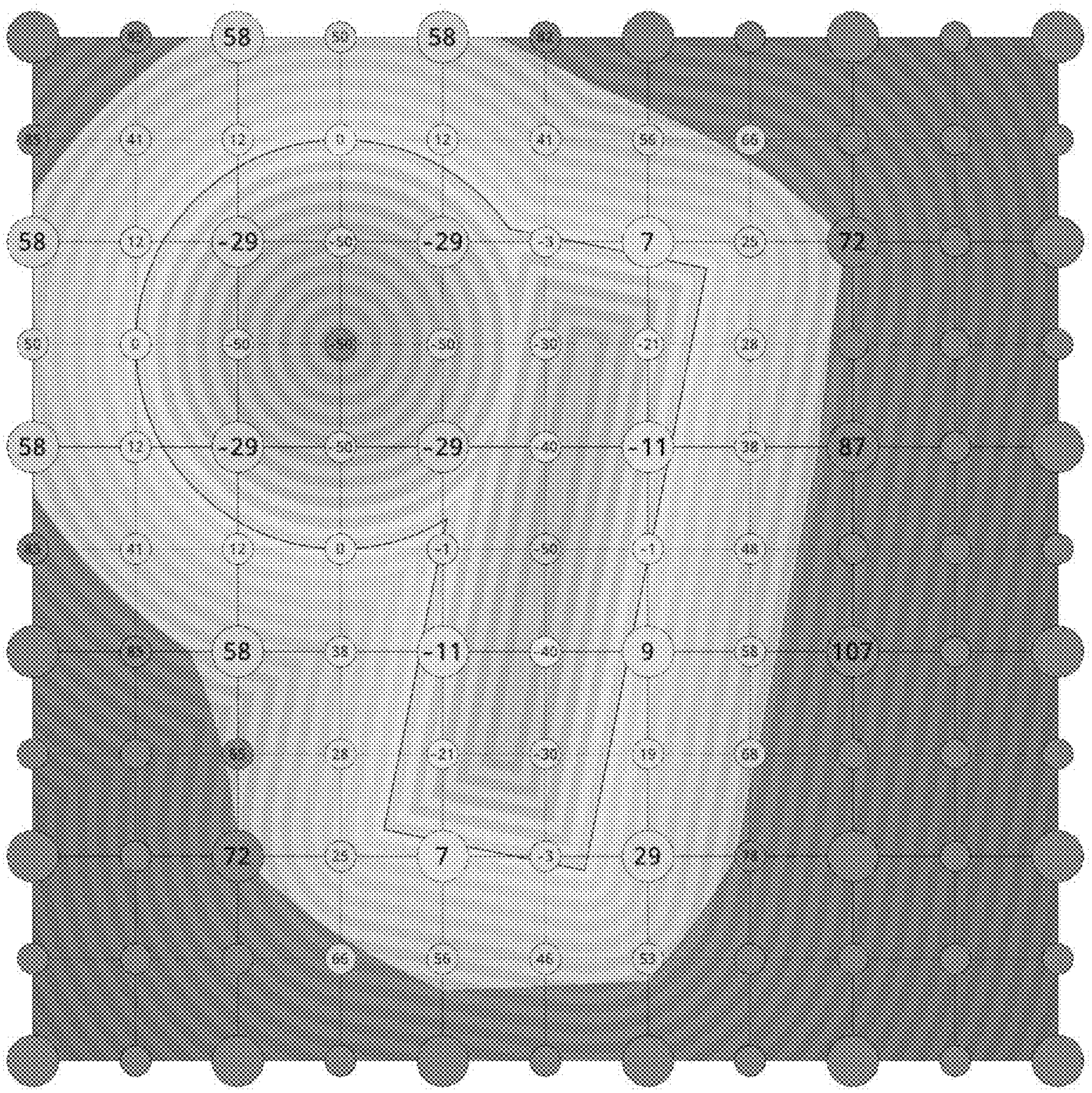

FIG. 3H highlights corrected values of the new corner points lying within the crust of the upsampled SDF grid of FIG. 3F. During encoding (e.g. at 210 of the method 200), the corrected value (i.e. ground-truth value) for each new corner point lying within the crust is determined, e.g. by being read out from an uncompressed, high-resolution SDF grid at points corresponding to the new corner points lying within the crust or computed from an alternative 2D or 3D representation of the keyhole shape. During decoding (e.g. at 256 of method 250), the corrected value for each new corner point lying within the crust is determined by adding a residuals/correction value obtained from a bytestream to a value obtained by upsampling (e.g. at 254 of method 250).

Figure 3I:
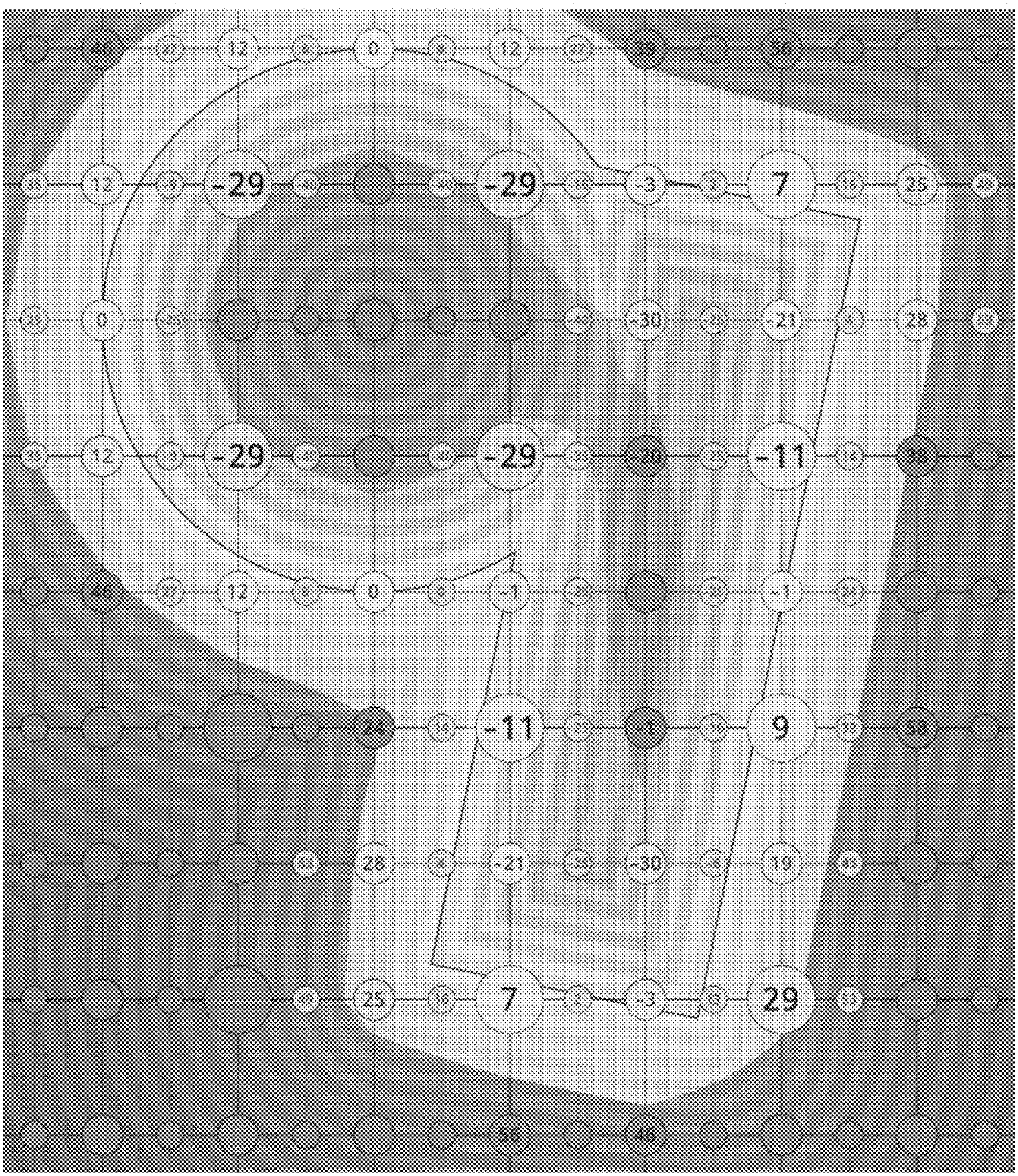

FIG. 3I illustrates a portion of an upsampled SDF grid produced by upsampling the SDF grid of FIG. 3H in the horizontal direction. As a result of the upsampling, new corner points are located between corner points of the coarse SDF grid of FIG. 3H in the horizontal direction. The values of the new corner points are determined by linear interpolation using the values of neighboring corner points of the SDF grid of FIG. 3H. The upsampled SDF grid illustrated in FIG. 3I can result, e.g., from the upsampling at 208 of method 200 (in an iteration where the upsampled SDF grid of FIG. 3H serves as the coarse SDF grid) or from the upsampling at 254 of method 250 (in an iteration where the upsampled SDF grid of FIG. 3H serves as the coarse SDF grid). FIG. 3I only provides values for new corner points that lie within a crust of FIG. 3I. As was the case for the upsampled SDF grid of FIGS. 3B and 3F, many of the values of the new corner points in FIG. 3I are inaccurate.

Figure 3J:
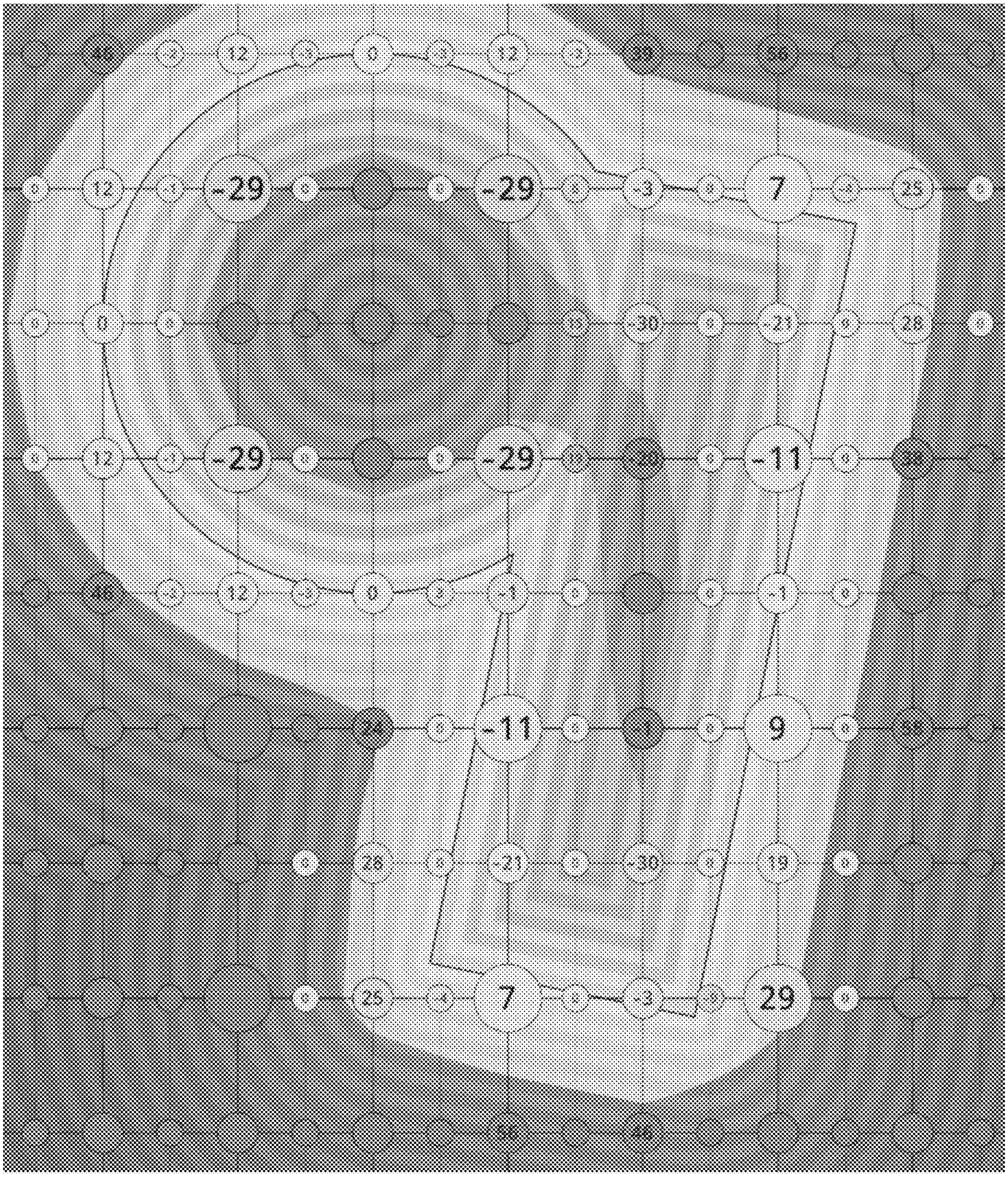

FIG. 3J provides residual/correction values for the new corner points lying within the crust of the upsampled SDF grid of FIG. 3I. In order to determine the residual/correction values during encoding (e.g. at 210 of the method 200), a ground-truth value for each new corner point lying within the crust is determined, e.g. by being read out from an uncompressed, high-resolution SDF grid at points corresponding to the new corner points lying within the crust or computed from an alternative 2D or 3D representation of the keyhole shape. In order to determine the residual/correction values during decoding (e.g. at 256 of the method 250), residuals/correction values are simply obtained from a bytestream that encodes the high-resolution SDF grid. As was the case with the residual/correction values provided in FIGS. 3D and 3G, many of the residual/correction values provided in FIG. 3J are equal to zero, and off-the-shelf entropy coding techniques can be used to achieve significant lossless compression.

Figure 3K:
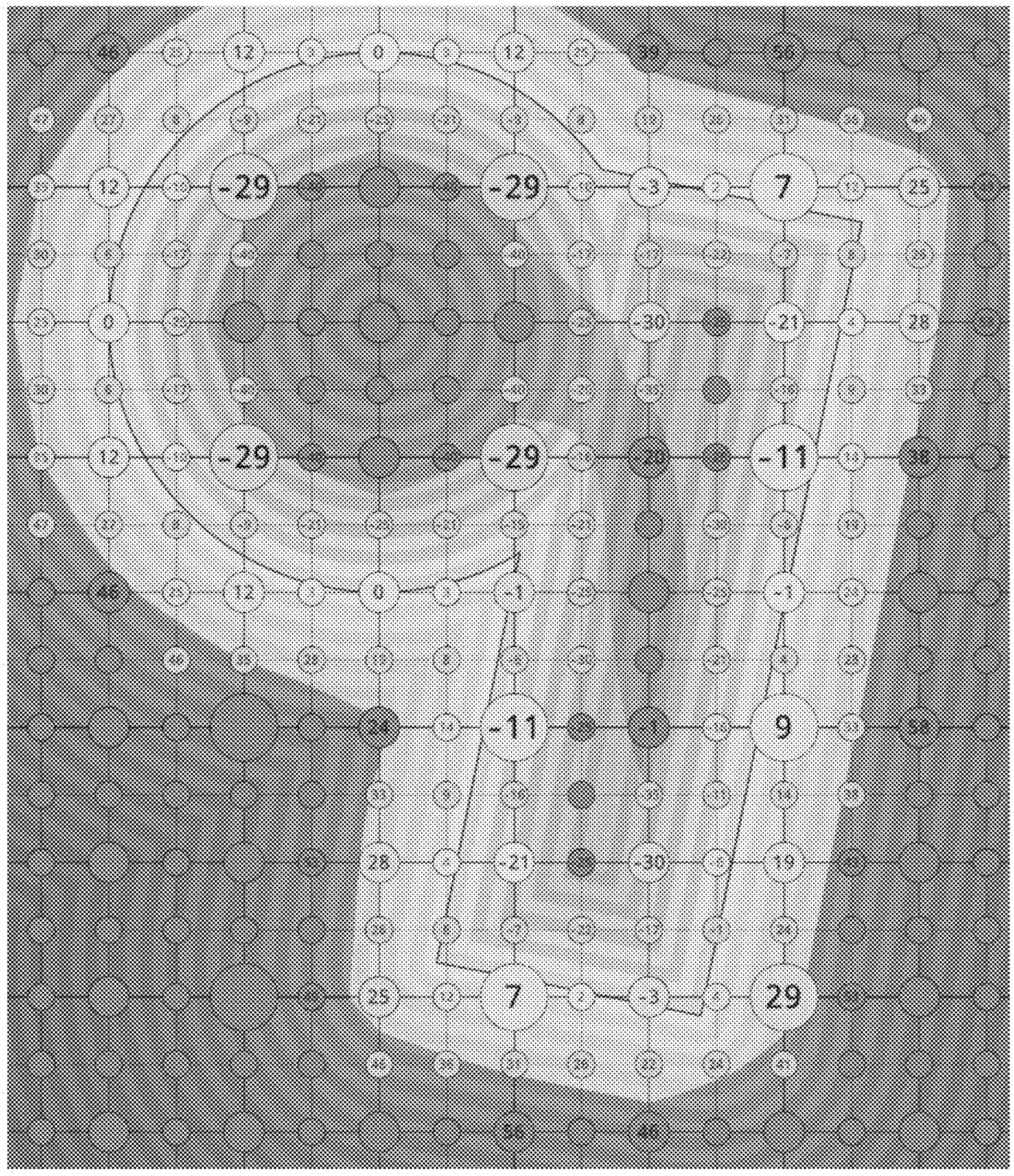
Figure 3L:
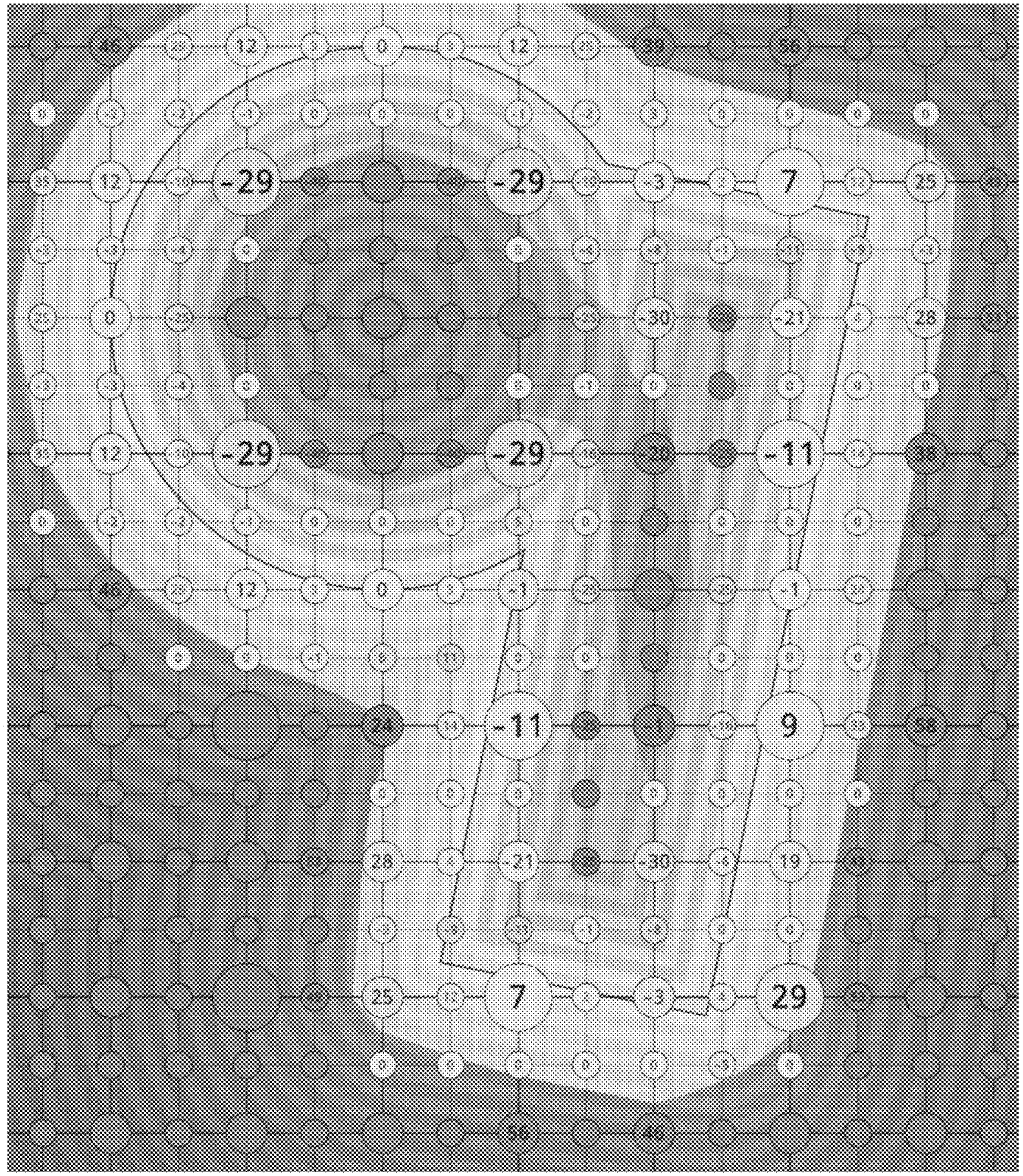

FIG. 3K illustrates further upsampling in the vertical direction. As a result of the upsampling, new corner points are located between corner points of a prior coarse SDF grid in the vertical direction. The values of the new corner points are determined by linear interpolation. FIG. 3L provides residual/correction values for the new corner points lying within the crust of the upsampled SDF grid of FIG. 3K, many of which are equal to zero.

Figure 3M:
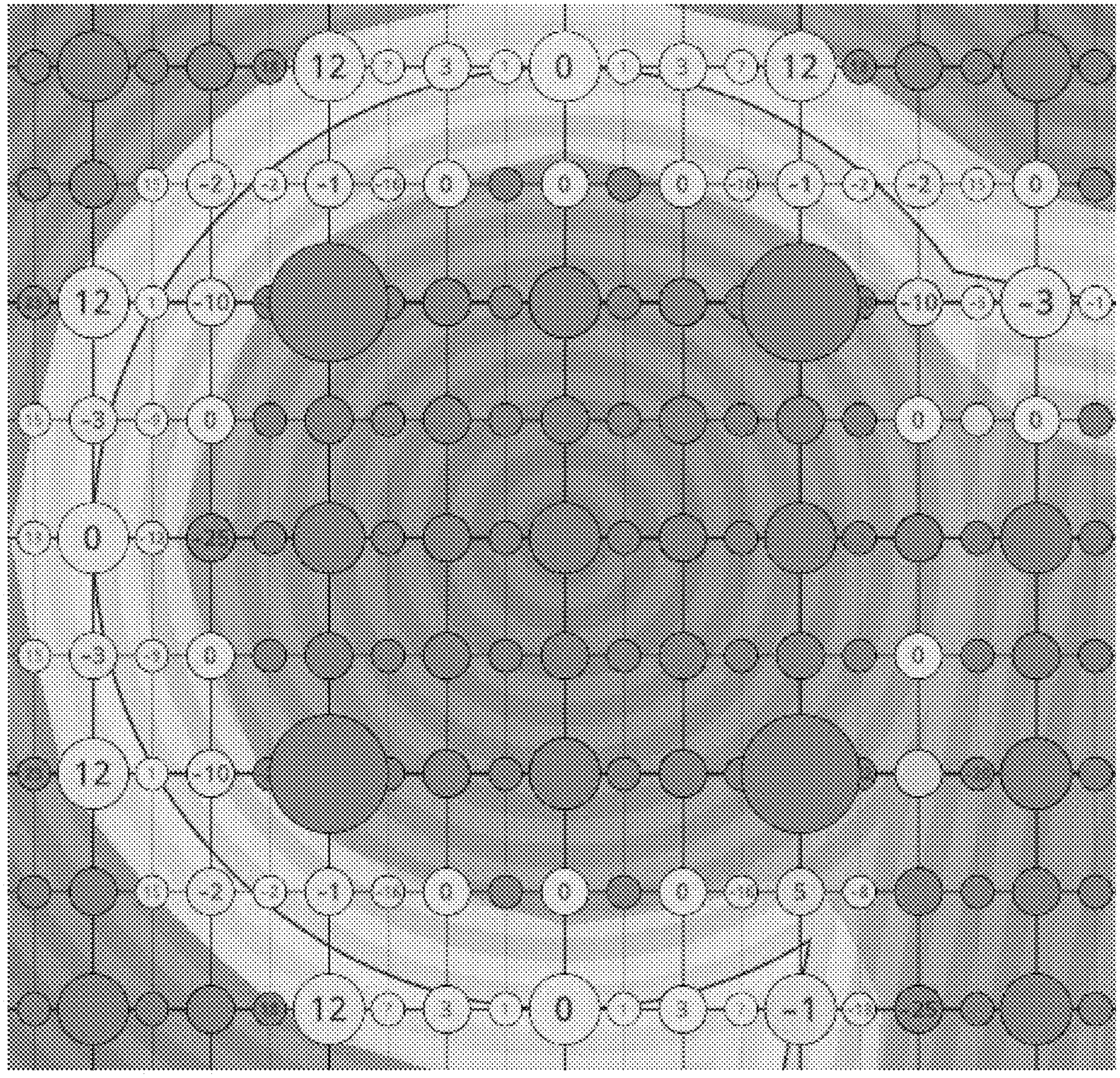
Figure 3N:
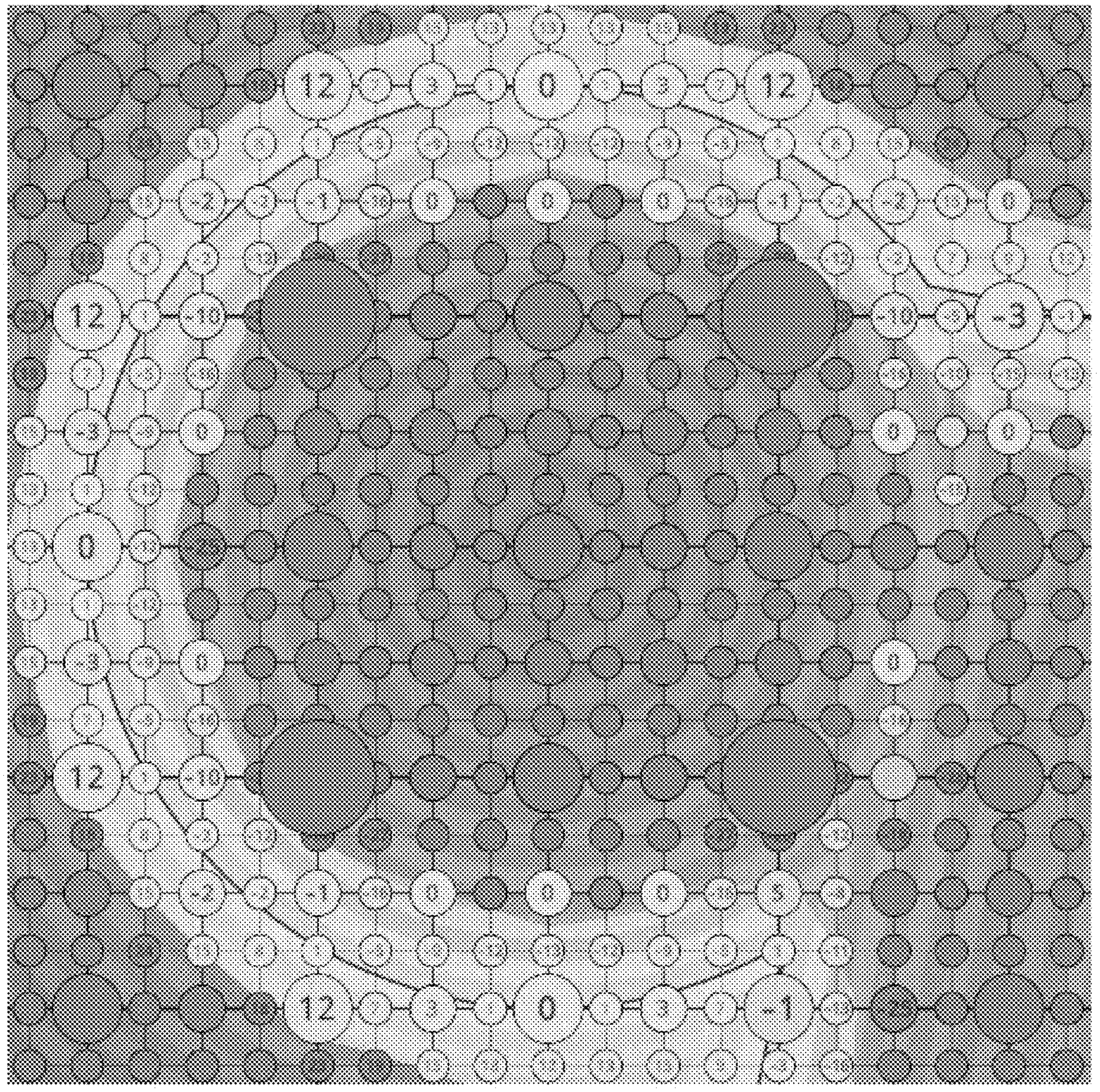

FIG. 3M illustrates further upsampling in the horizontal direction for a portion of the keyhole shape and provides provides residual/correction values for the new corner points lying within the crust of the upsampled SDF grid. FIG. 3N illustrates further upsampling in the vertical direction for the portion of the keyhole shape and provides residual/correction values for the new corner points lying within the crust of the upsampled SDF grid.

Systems and architectures that are suitable for representing and manipulating SDF grids that are compressed, stored, and/or transmitted in accordance with the aforementioned techniques are provided herein below. For example, the systems and architectures that are provided herein below are suitable for representing and manipulating SDF grids in a variety of different applications, including in computer graphics, computer vision, robotics (e.g. robot path planning), physics simulation and collision detection, computer-aided design (CAD) modeling, and design. It should be strongly noted that the following information is set forth for illustrative purposes and should not be construed as limiting in any manner. Any of the following features may be optionally incorporated with or without the exclusion of other features described.

Parallel Processing Architecture

Figure 4:
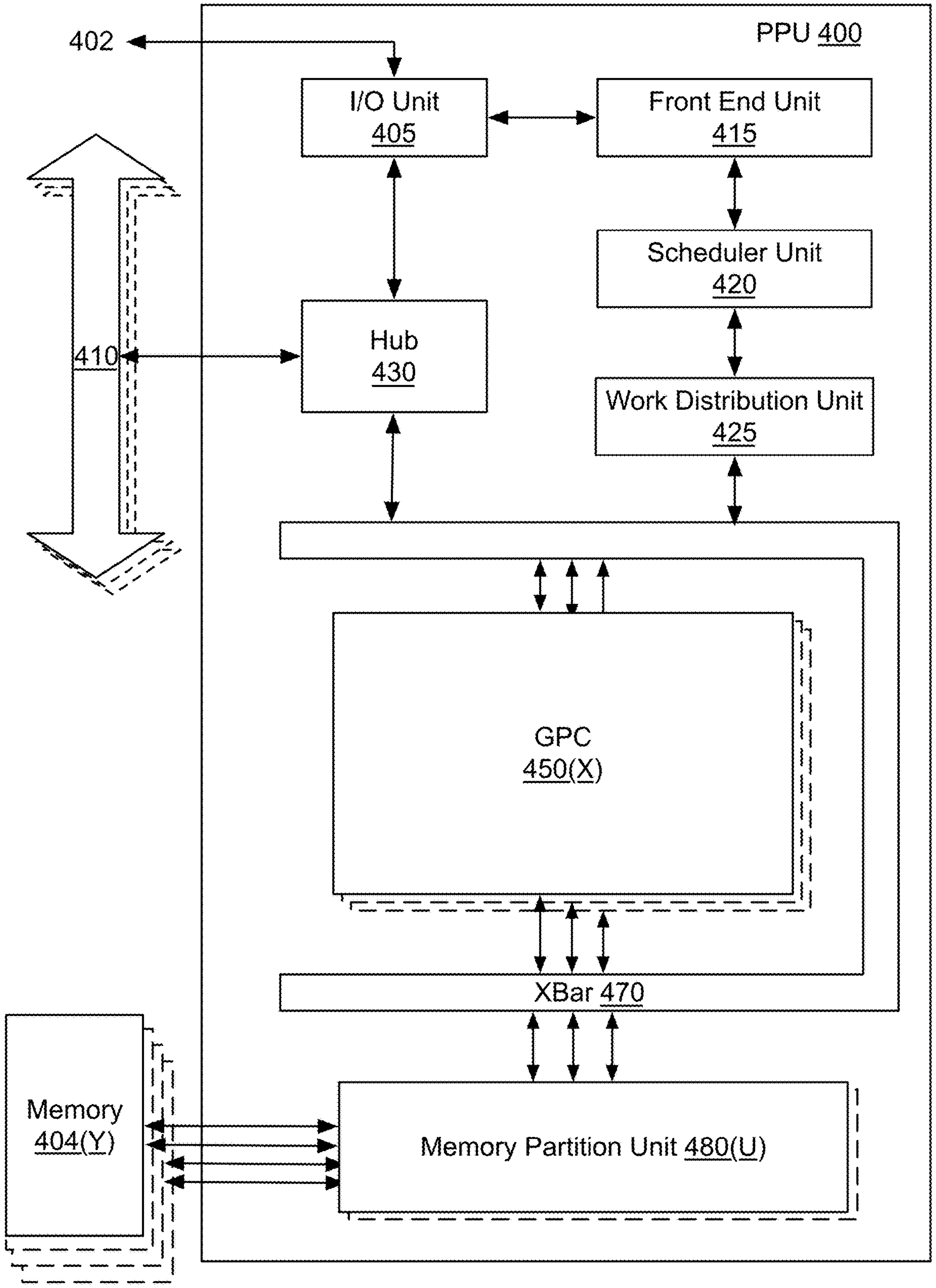
FIG. 4 illustrates an example parallel processing unit suitable for use in implementing some embodiments of the present disclosure.

FIG. 4 illustrates a parallel processing unit (PPU) 400, in accordance with an embodiment. In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-*bit* integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
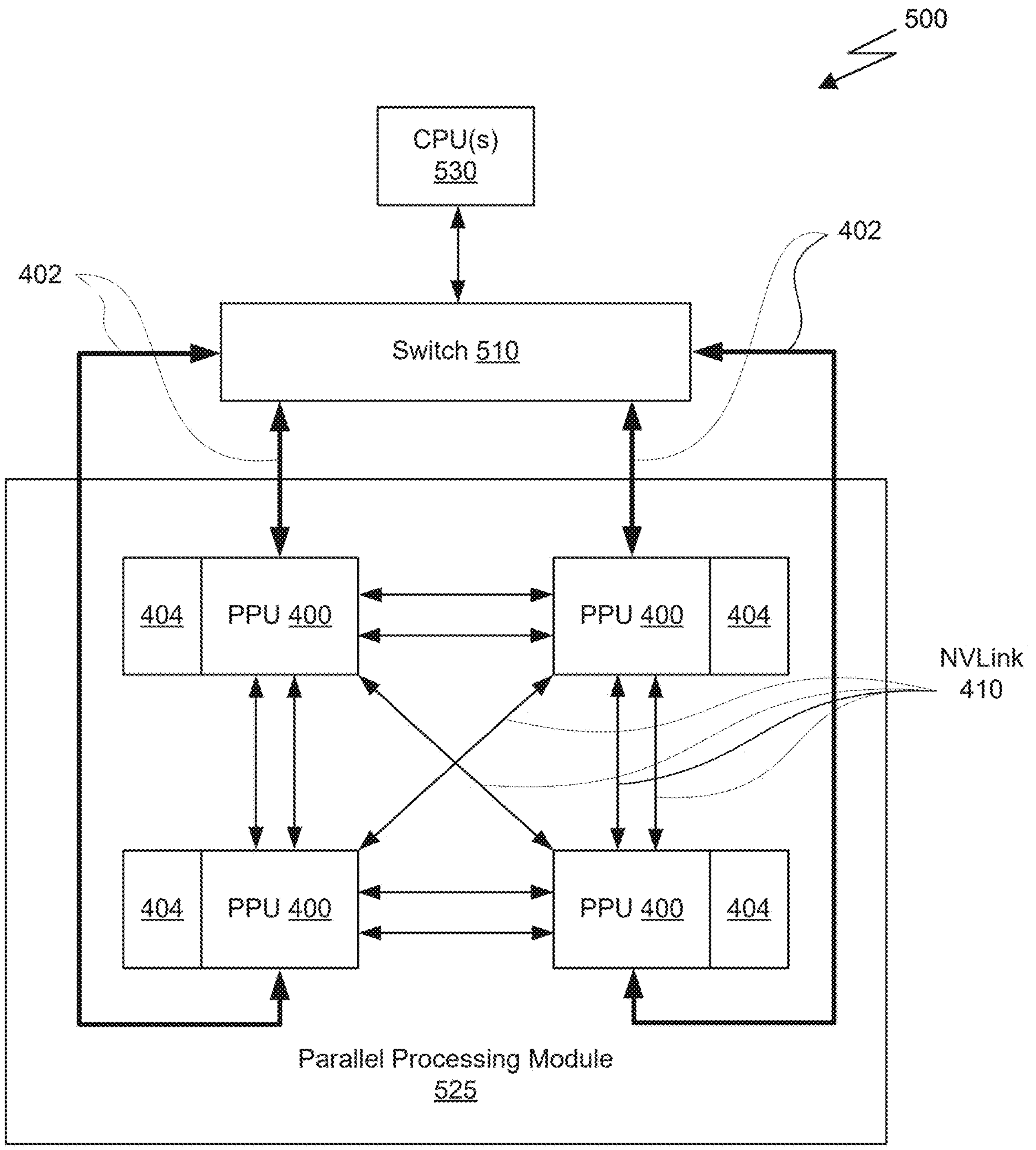
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The processing system 500 includes a CPU 530, switch 510, and multiple PPUs 400, and respective memories 404.

Figure 5B:
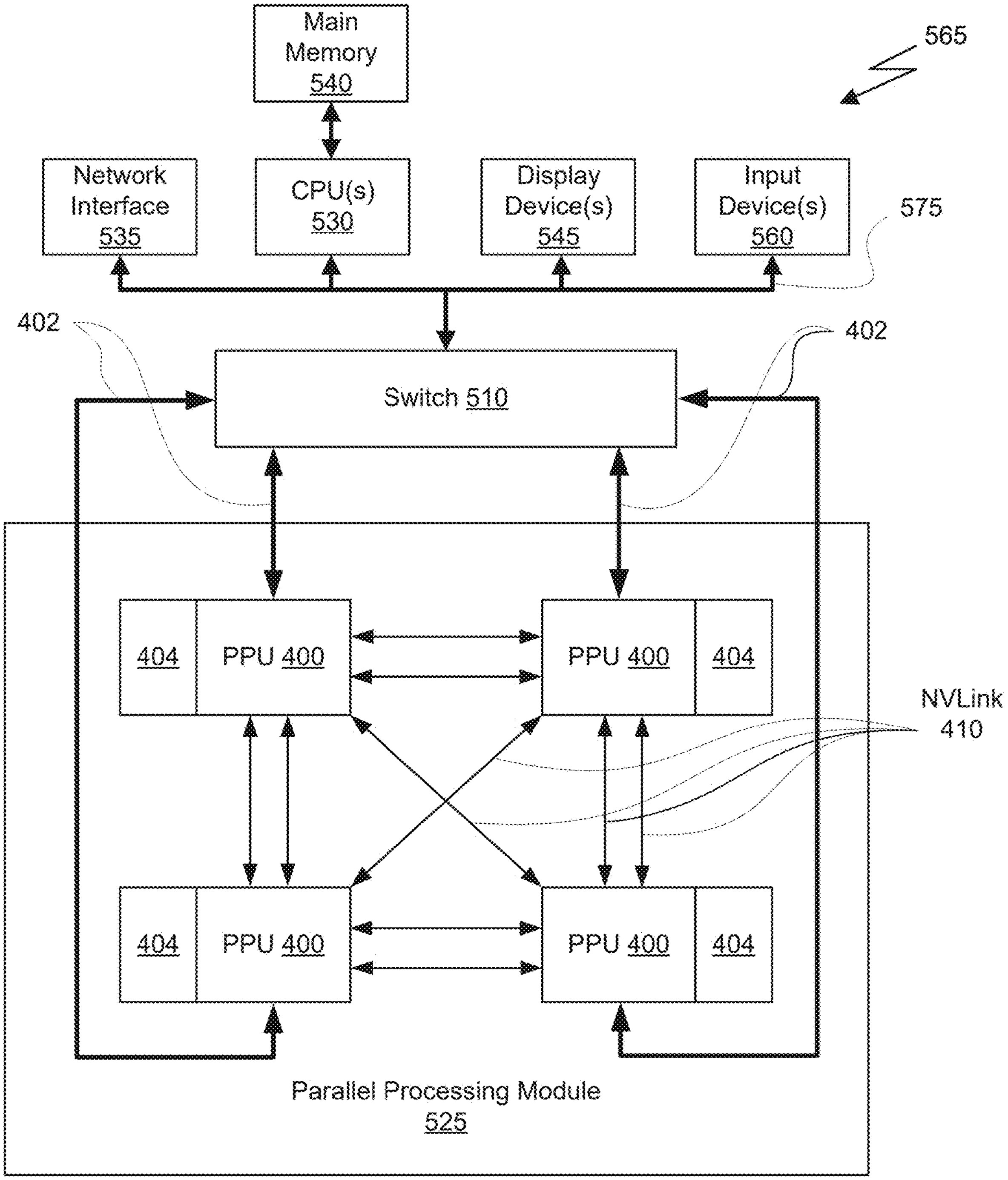
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
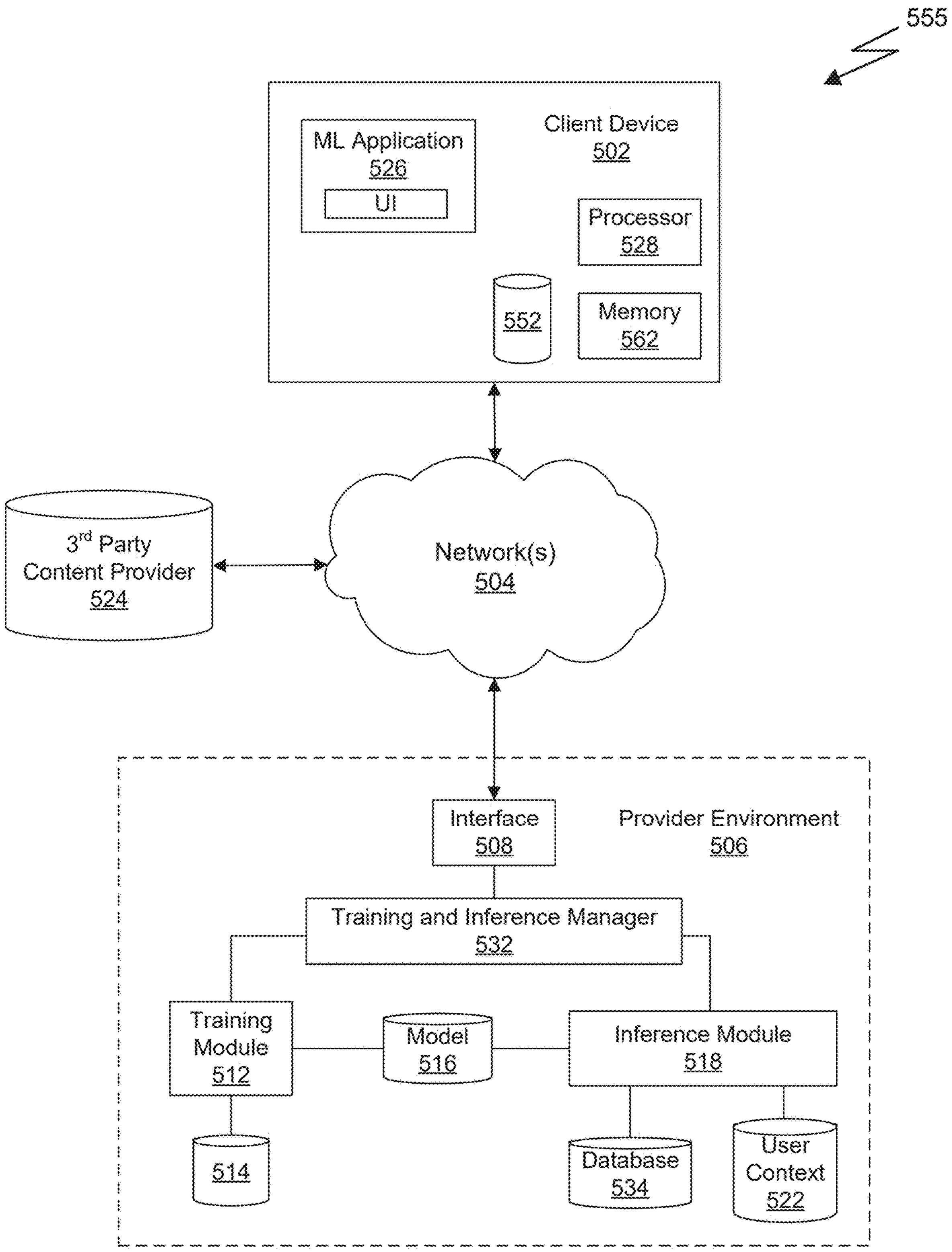
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, or character for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Example Streaming System

Figure 6:
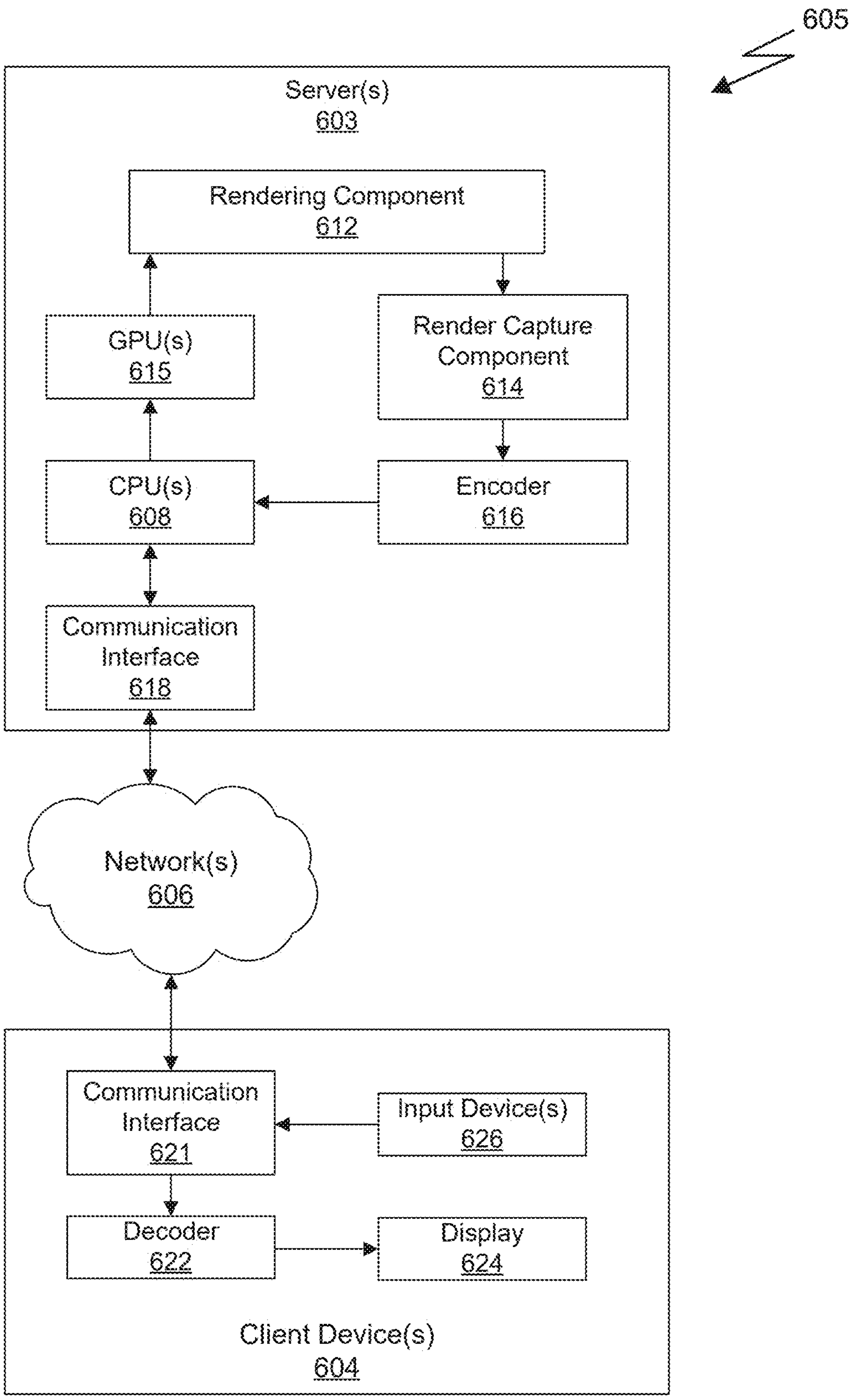
FIG. 6 illustrates an exemplary game streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network (s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device (s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for compressing a digital representation of an object, the method comprising:
- defining an initial signed distance function (SDF) grid representing the object;
- performing, for each of a plurality of iterations:
  - upsampling a prior coarse SDF grid to produce an upsampled SDF grid comprising a predicted SDF value for each of a plurality of new corners,
  - identifying one or more new corners that satisfy a predetermined, distance-based condition, and
  - computing, for each respective identified new corner, a residual value that corrects the predicted SDF value for the respective identified new corner to provide a corrected SDF value for the respective identified new corner; and
- providing a data stream that encodes a final SDF grid representing the object, the data stream comprising the residual values computed during each of the plurality of iterations,
- wherein the prior coarse SDF grid is, in a first of the plurality of iterations, the initial SDF grid and is, in each subsequent iteration, an SDF grid produced during a prior iteration.

2. The method according to claim 1, wherein a correspondence between each respective residual value in the data stream and a corner in the final SDF grid is provided by a position of the respective residual value in the data stream.

3. The method according to claim 1, wherein the data stream encodes the final SDF grid without including separate bits or bytes that provide residual position information.

4. The method according to claim 1, further comprising:
- compressing the data stream; and
- transmitting the compressed data stream via a network and/or storing the compressed data stream to a disk.

5. The method according to claim 4, wherein the compressing the data stream is performed via an entropy coding technique.

6. The method according to claim 1, wherein the identifying the one or more new corners that satisfy the predetermined, distance-based condition comprises identifying one or more new corners that lie within or adjacent to a crust that surrounds a surface of the object.

7. The method according to claim 6, wherein a thickness of the crust is defined based on a resolution of the upsampled SDF grid or based on a resolution of the prior coarse SDF grid.

8. The method according to claim 7, wherein the thickness of the crust is defined to provide lossless compression of the digital representation of the object.

9. The method according to claim 1, wherein an attribute value is provided for each corner in the initial SDF grid and for each corner in the final SDF grid, the method further comprising:
- performing, for each iteration of the plurality of iterations:
  - predicting, for each of a plurality of new corners produced by upsampling the prior coarse SDF grid, an attribute value, and
  - computing, for each respective identified new corner, an attribute residual value that corrects the predicted attribute value for the respective identified new corner to provide a corrected attribute value for the respective identified new corner,
- wherein the data stream that encodes the final SDF grid representing the object additionally comprises the attribute residual values computed during each of the plurality of iterations.

10. The method according to claim 9, wherein the attribute value is a color value and/or a texture value.

11. A computer-implemented method for generating an SDF grid representing an object, the method comprising:
- decoding the data stream, provided by the method according to claim 1, to generate the SDF grid representing the object.

12. A system for generating an SDF grid representing an object, the system comprising:
- processing circuitry configured to decode the data stream, provided by the method according to claim 1, to generate the SDF grid representing the object; and
- memory configured to store the SDF grid representing the object.

13. A system for compressing a digital representation of an object, the system comprising:
- processing circuitry configured to:
  - define an initial signed distance function (SDF) grid representing the object,
  - perform, for each of a plurality of iterations:
    - upsampling a prior coarse SDF grid to produce an upsampled SDF grid comprising a predicted SDF value for each of a plurality of new corners,
    - identifying one or more new corners that satisfy a predetermined, distance-based condition, and
    - computing, for each respective identified new corner, a residual value that corrects the predicted SDF value for the respective identified new corner to provide a corrected SDF value for the respective identified new corner, and
  - provide a data stream that encodes a final SDF grid representing the object, the data stream comprising the residual values computed during each of the plurality of iterations; and
- memory configured to store the data stream,
- wherein the prior coarse SDF grid is, in a first of the plurality of iterations, the initial SDF grid and is, in each subsequent iteration, an SDF grid produced during a prior iteration.

14. The system according to claim 13, wherein a correspondence between each respective residual value in the data stream and a corner in the final SDF grid is provided by a position of the respective residual value in the data stream.

15. The system according to claim 13, wherein the data stream encodes the final SDF grid without including separate bits or bytes that provide residual position information.

16. The system according to claim 13, the processing circuitry further configured to:

compress the data stream; and transmit the compressed data stream via a network and/or store the compressed data stream to a disk.

17. The system according to claim 13, wherein the identifying the one or more new corners that satisfy the predetermined, distance-based condition comprises identifying one or more new corners that lie within or adjacent to a crust that surrounds a surface of the object.

18. The system according to claim 17, wherein a thickness of the crust is defined based on a resolution of the upsampled SDF grid or based on a resolution of the prior coarse SDF grid.

19. A non-transitory computer readable medium having stored thereon executable instructions that, when executed by processing circuitry, cause the processing circuitry to perform a method for compressing a digital representation of an object, the method comprising:

defining an initial signed distance function (SDF) grid representing the object;

performing, for each of a plurality of iterations:

upsampling a prior coarse SDF grid to produce an upsampled SDF grid comprising a predicted SDF value for each of a plurality of new corners, identifying one or more new corners that satisfy a predetermined, distance-based condition, and computing, for each respective identified new corner, a residual value that corrects the predicted SDF value for the respective identified new corner to provide a corrected SDF value for the respective identified new corner; and providing a data stream that encodes a final SDF grid representing the object, the data stream comprising the residual values computed during each of the plurality of iterations, wherein the prior coarse SDF grid is, in a first of the plurality of iterations, the initial SDF grid and is, in each subsequent iteration, an SDF grid produced during a prior iteration.

20. The non-transitory computer readable medium according to claim 19, wherein a correspondence between each respective residual value in the data stream and a corner in the final SDF grid is provided by a position of the respective residual value in the data stream.

* * * * *